United States Patent
Keefer et al.

(10) Patent No.: US 6,921,597 B2
(45) Date of Patent: Jul. 26, 2005

(54) ELECTRICAL CURRENT GENERATION SYSTEM

(75) Inventors: Bowie G. Keefer, Vancouver (CA); Christopher R. McLean, Vancouver (CA); Michael J. Brown, West Vancouver (CA)

(73) Assignee: QuestAir Technologies Inc., Burnaby (CA)

( * ) Notice: Subject to any disclaimer, the term of this patent is extended or adjusted under 35 U.S.C. 154(b) by 490 days.

(21) Appl. No.: 09/808,715

(22) Filed: Mar. 14, 2001

(65) Prior Publication Data

US 2002/0004157 A1 Jan. 10, 2002

Related U.S. Application Data

(63) Continuation-in-part of application No. PCT/CA99/00823, filed on Sep. 14, 1999.
(60) Provisional application No. 60/100,091, filed on Sep. 14, 1998.

(30) Foreign Application Priority Data

Jun. 10, 1999 (CA) ............................................ 2274240

(51) Int. Cl.⁷ ............................................... H01M 8/04
(52) U.S. Cl. ............................ 429/34; 429/13; 429/19; 429/20; 429/25; 429/26
(58) Field of Search ............................. 429/13, 19, 20, 429/25, 26, 34

(56) References Cited

U.S. PATENT DOCUMENTS

| | | |
|---|---|---|
| 3,094,569 A | 6/1963 | Thomas |
| 3,204,388 A | 9/1965 | Asker |
| 3,430,418 A | 3/1969 | Wagner |
| 3,513,631 A | 5/1970 | Siebert et al. |
| 3,564,816 A | 2/1971 | Batta |
| 3,594,984 A | 7/1971 | Toyama et al. |
| 3,847,672 A | 11/1974 | Trocciola et al. ......... 136/86 C |
| 3,865,924 A | 2/1975 | Gidaspow et al. |
| 4,019,879 A | 4/1977 | Rabo et al. |
| 4,144,037 A | 3/1979 | Armond et al. |
| 4,153,434 A | 5/1979 | Settlemyer |
| 4,200,682 A | 4/1980 | Sederquist |
| 4,272,265 A | 6/1981 | Snyder |
| 4,322,394 A | 3/1982 | Mezey et al. |
| 4,354,859 A | 10/1982 | Keller et al. |
| 4,406,675 A | 9/1983 | Dangieri et al. |
| 4,452,612 A | 6/1984 | Mattia |
| 4,530,705 A | 7/1985 | Firey |
| 4,532,192 A | 7/1985 | Baker et al. |

(Continued)

FOREIGN PATENT DOCUMENTS

| | | |
|---|---|---|
| CA | 1256038 | 6/1989 |
| CA | 2016045 | 8/1994 |

(Continued)

OTHER PUBLICATIONS

Carvill et al., *AIChE J.* 42(10):2765–2772, 1996.
Ding et al., *Chemical Engineering Science* 55:3461–3474, 2000.

(Continued)

*Primary Examiner*—Hoa Van Le
(74) *Attorney, Agent, or Firm*—Klarquist Sparkman, LLP

(57) ABSTRACT

An electrical generating system consists of a fuel cell, and an oxygen gas delivery. The fuel cell includes and anode channel having an anode gas inlet for receiving a supply of hydrogen gas, a cathode channel having a cathode gas inlet and a cathode gas outlet, and an electrolyte in communication with the anode and cathode channel for facilitating ion exchange between the anode and cathode channel. The oxygen gas delivery system is coupled to the cathode gas inlet and delivers oxygen gas to the cathode channel. The electrical current generating system also includes gas recirculation means couple to the cathode gas outlet for recirculating a portion of cathode exhaust gas exhausted from the cathode gas outlet to the cathode gas inlet.

16 Claims, 22 Drawing Sheets

U.S. PATENT DOCUMENTS

| | | | |
|---|---|---|---|
| 4,553,981 A | 11/1985 | Fuderer | |
| 4,555,453 A | 11/1985 | Appleby | 429/41 |
| 4,578,214 A | 3/1986 | Jungerhans | |
| 4,587,114 A | 5/1986 | Hirai et al. | |
| 4,595,642 A | 6/1986 | Nakanishi et al. | 429/19 |
| 4,696,682 A | 9/1987 | Hirai et al. | |
| 4,702,903 A | 10/1987 | Keefer | |
| 4,726,816 A | 2/1988 | Fuderer | |
| 4,743,276 A | 5/1988 | Nishida et al. | |
| 4,758,253 A | 7/1988 | Davidson et al. | |
| 4,759,997 A | 7/1988 | Ohyauchi et al. | 429/19 |
| 4,781,735 A | 11/1988 | Tagawa et al. | 55/26 |
| 4,783,433 A | 11/1988 | Tajima et al. | |
| 4,790,858 A | 12/1988 | Sircar | |
| 4,801,308 A | 1/1989 | Keefer | 55/25 |
| 4,816,121 A | 3/1989 | Keefer | 204/156 |
| 4,914,076 A | 4/1990 | Tsuji et al. | |
| 4,917,711 A | 4/1990 | Xie et al. | |
| 4,963,339 A | 10/1990 | Krishnamurthy et al. | |
| 4,968,329 A | 11/1990 | Keefer | |
| 4,969,935 A | 11/1990 | Hay | 55/26 |
| 4,988,580 A | 1/1991 | Ohsaki et al. | 429/19 |
| 4,994,331 A | 2/1991 | Cohen | |
| 5,068,159 A | 11/1991 | Kinoshita | |
| 5,079,103 A | 1/1992 | Schramm | 429/17 |
| 5,082,473 A | 1/1992 | Keefer | |
| 5,096,469 A | 3/1992 | Keefer | |
| 5,096,470 A | 3/1992 | Krishnamurthy | |
| 5,126,310 A | 6/1992 | Golden et al. | |
| 5,133,784 A | 7/1992 | Boudet et al. | |
| 5,147,735 A | 9/1992 | Ippommatsu et al. | |
| 5,175,061 A | 12/1992 | Hildebrandt et al. | 429/16 |
| 5,217,916 A | 6/1993 | Anderson et al. | |
| 5,227,598 A | 7/1993 | Woodmansee et al. | |
| 5,245,110 A | 9/1993 | Van Dijk et al. | |
| 5,246,676 A | 9/1993 | Hay | |
| 5,248,325 A | 9/1993 | Kagimoto et al. | |
| 5,256,172 A | 10/1993 | Keefer | |
| 5,256,174 A | 10/1993 | Kai et al. | |
| 5,258,571 A | 11/1993 | Golden et al. | |
| 5,271,916 A | 12/1993 | Vandenborgh et al. | |
| 5,282,886 A | 2/1994 | Kobayashi et al. | |
| 5,328,503 A | 7/1994 | Kumar | 95/101 |
| 5,360,679 A | 11/1994 | Buswell et al. | |
| 5,366,818 A | 11/1994 | Wilkinson et al. | 429/13 |
| 5,393,326 A | 2/1995 | Engler et al. | |
| 5,411,578 A | 5/1995 | Watson et al. | 95/101 |
| 5,415,748 A | 5/1995 | Emiliani et al. | |
| 5,429,665 A | 7/1995 | Botich | |
| 5,431,716 A | 7/1995 | Ebbeson | |
| 5,434,016 A | 7/1995 | Benz et al. | 429/13 |
| 5,441,559 A | 8/1995 | Petit et al. | |
| 5,487,775 A | 1/1996 | LaCava et al. | |
| 5,509,956 A | 4/1996 | Opperman et al. | |
| 5,523,326 A | 6/1996 | Dandekar et al. | 548/706 |
| 5,529,763 A | 6/1996 | Peng et al. | |
| 5,529,970 A | 6/1996 | Peng | |
| 5,531,809 A | 7/1996 | Golden et al. | |
| 5,543,238 A | 8/1996 | Strasser | 429/17 |
| 5,593,478 A | 1/1997 | Hill et al. | |
| 5,604,047 A | 2/1997 | Bellows et al. | 429/19 |
| 5,632,807 A | 5/1997 | Tomita et al. | |
| 5,645,950 A | 7/1997 | Benz et al. | 429/13 |
| 5,646,305 A | 7/1997 | Wagner et al. | |
| 5,656,067 A | 8/1997 | Watson et al. | |
| 5,658,370 A | 8/1997 | Vigor et al. | |
| 5,711,926 A | 1/1998 | Knaebel | 423/359 |
| 5,714,276 A | 2/1998 | Okamoto | 429/17 |
| 5,766,311 A | 6/1998 | Ackley et al. | |
| 5,811,201 A | 9/1998 | Skowronski | 429/17 |
| 5,827,358 A | 10/1998 | Kulish et al. | |
| 5,876,486 A | 3/1999 | Steinwandel et al. | |
| 5,891,217 A | 4/1999 | Lemcoff et al. | |
| 5,900,329 A | 5/1999 | Reiter et al. | 429/17 |
| 5,917,136 A | 6/1999 | Gaffney et al. | 95/98 |
| 5,925,322 A | 7/1999 | Werth | |
| 5,955,039 A | 9/1999 | Dowdy | |
| 5,958,109 A | 9/1999 | Fuderer | |
| 5,968,680 A | 10/1999 | Wolfe et al. | |
| 5,980,857 A | 11/1999 | Kapoor et al. | 423/648.1 |
| 5,981,096 A | 11/1999 | Hornberg et al. | |
| 5,998,056 A | 12/1999 | Divisek et al. | |
| 6,022,399 A | 2/2000 | Ertl et al. | |
| 6,045,933 A | 4/2000 | Okamoto | 429/17 |
| 6,051,050 A * | 4/2000 | Keefer et al. | 95/96 |
| 6,056,804 A * | 5/2000 | Keefer et al. | 95/96 |
| 6,060,032 A | 5/2000 | Hable et al. | |
| 6,063,161 A | 5/2000 | Keefer et al. | |
| 6,077,620 A | 6/2000 | Pettit | |
| 6,090,312 A | 7/2000 | Ziaka et al. | |
| 6,143,057 A | 11/2000 | Bülow et al. | |
| 6,162,558 A | 12/2000 | Borup et al. | |
| 6,176,897 B1 | 1/2001 | Keefer | 95/98 |
| 6,190,623 B1 | 2/2001 | Sanger et al. | 422/192 |
| 6,190,791 B1 | 2/2001 | Hornburg | 429/17 |
| 6,200,365 B1 | 3/2001 | Eimer et al. | |
| 6,210,822 B1 | 4/2001 | Abersfelder et al. | |
| 6,231,644 B1 | 5/2001 | Jain et al. | |
| 6,255,010 B1 | 7/2001 | George et al. | |
| 6,283,723 B1 | 9/2001 | Milburn et al. | 417/273 |
| 6,293,998 B1 | 9/2001 | Dolan et al. | |
| 6,296,823 B1 | 10/2001 | Ertl et al. | |
| 6,312,843 B1 | 11/2001 | Kimbara et al. | 429/25 |
| 6,398,853 B1 | 6/2002 | Keefer et al. | |
| 6,406,523 B1 | 6/2002 | Conner et al. | |
| 6,428,915 B1 | 8/2002 | Ban et al. | |
| 6,451,095 B1 * | 9/2002 | Keefer et al. | 96/125 |
| 6,607,854 B1 | 8/2003 | Rehg et al. | |
| 6,692,545 B2 * | 2/2004 | Gittleman et al. | 48/128 |
| 2001/0047824 A1 | 12/2001 | Hill et al. | |
| 2002/0004157 A1 | 1/2002 | Keefer et al. | |
| 2002/0098394 A1 | 7/2002 | Keefer et al. | |
| 2002/0104518 A1 | 8/2002 | Keefer et al. | |
| 2002/0110503 A1 | 8/2002 | Gittleman et al. | |
| 2002/0110504 A1 | 8/2002 | Gittleman et al. | |
| 2002/0112479 A1 | 8/2002 | Keefer et al. | |
| 2002/0127442 A1 | 9/2002 | Connor et al. | |
| 2002/0142198 A1 | 10/2002 | Towler et al. | |
| 2002/0142208 A1 | 10/2002 | Keefer et al. | |
| 2003/0070550 A1 * | 4/2003 | Keefer et al. | 96/125 |
| 2003/0143448 A1 | 7/2003 | Keefer et al. | |
| 2003/0157390 A1 | 8/2003 | Keefer et al. | |
| 2004/0005492 A1 | 1/2004 | Keefer et al. | |

FOREIGN PATENT DOCUMENTS

| | | |
|---|---|---|
| CA | 2109055 | 2/1999 |
| CA | 2087972 | 1/2000 |
| CA | 2087973 | 1/2001 |
| DE | 3913581 A1 | 11/1990 |
| EP | 0 341 189 A1 | 8/1989 |
| EP | 0 345 908 | 12/1989 |
| EP | 0 143 537 B1 | 3/1990 |
| EP | 0 143 537 | 3/1990 |
| EP | 0 143 537 A2 | 3/1990 |
| EP | 0 681 860 A2 | 11/1995 |
| EP | 0 691 701 A1 | 10/1996 |
| EP | 0737648 | 10/1996 |
| EP | 0 750 361 A | 12/1996 |
| EP | 0 751 045 | 1/1997 |
| EP | 0 853 967 | 7/1998 |
| EP | 1 095 689 A1 | 10/1999 |

| | | |
|---|---|---|
| EP | 1 070 531 A2 | 1/2001 |
| EP | 1 172 772 | 1/2001 |
| GB | 2 042 365 | 9/1980 |
| JP | 62274561 | 11/1978 |
| JP | 59075574 A | 4/1984 |
| JP | 62278770 | 3/1987 |
| JP | 63166137 | 7/1988 |
| JP | 63228572 | 9/1988 |
| JP | 04206161 | 7/1992 |
| JP | 05 166528 | 7/1993 |
| JP | 07094200 | 7/1995 |
| JP | 8045526 A2 | 2/1996 |
| JP | 10027621 | 1/1998 |
| JP | 63034862 | 2/1998 |
| JP | 10325360 A | 12/1998 |
| JP | 11214021 A2 | 8/1999 |
| WO | WO 94/04249 | 8/1992 |
| WO | WO 96/13871 | 5/1996 |
| WO | WO 98/29182 | 9/1998 |
| WO | 99/01202 * | 1/1999 |
| WO | WO 99/19249 | 4/1999 |
| WO | WO 99/28013 | 6/1999 |
| WO | WO 99/46032 | 9/1999 |
| WO | WO 00/16425 | 3/2000 |
| WO | WO 00/16880 | 3/2000 |
| WO | WO 0076630 | 12/2000 |
| WO | WO 01/47050 | 6/2001 |
| WO | WO 02/24309 | 3/2002 |
| WO | WO 02/35623 | 5/2002 |
| WO | WO 02/37590 | 5/2002 |
| WO | WO 02/45821 | 6/2002 |
| WO | WO 02/47797 | 6/2002 |
| WO | WO 02/56400 | 7/2002 |

OTHER PUBLICATIONS

Ding et al., *Chemical Engineering Science* 55:3929–3940, 2000.

Iyuke et al., *Chemical Engineering Science* 55:4745–4755, 2000.

International Search Report from International Application No. PCT/CA99/00823.

Vaporciyan and Kadiec, "Periodic Separating Reactors: Experiments and Theory," *AIChE Journal* 35, pp. 831–844 (1989), XP 000674845.

Chatsiriwech et al., "Enhancement of Catalytic Reaction by Pressure Swing Adsorption," *Catalysis Today* 20, Elsevier Science, pp. 351–366 (1994), XP 000672871.

Hufton et al., "Sorption Enhanced Reaction Process for Hydrogen Production," *AIChE Journal*, vol. 45 no. 2, 248–256 (Feb. 1999).

* cited by examiner

ELECTRICAL CURRENT GENERATION SYSTEM

CROSS REFERENCE TO RELATED APPLICATIONS

The present application is a continuation-in-part of prior international application No. PCT/CA99/00823, filed Sep. 14, 1999, which claimed priority from U.S. provisional application No. 60/100,091, filed Sep. 14, 1998, and Canadian patent application No. 2,274,240, filed Jun. 10, 1999, which applications are incorporated herein by reference.

FIELD

The present invention relates to a fuel cell for the generation of electrical current. In particular, the present invention relates to a fuel cell-based electrical generation system which employs pressure swing adsorption for enhancing the efficiency of the fuel cell.

BACKGROUND

Fuel cells provide an environmentally friendly source of electrical current. One form of fuel cell used for generating electrical power includes an anode for receiving hydrogen gas, a cathode for receiving oxygen gas, and an alkaline electrolyte. Another form of fuel cell includes an anode channel for receiving a flow of hydrogen gas, a cathode channel for receiving a flow of oxygen gas, and a polymer electrolyte membrane (PEM) which separates the anode channel from the cathode channel. In both instances, oxygen gas which enters the cathode reacts with hydrogen ions which cross the electrolyte to generate a flow of electrons. Environmentally safe water vapor is also produced as a byproduct. However, several factors have limited the widespread use of fuel cells as power generation systems.

In order to extract a continuous source of electrical power from a fuel cell, it is necessary to provide the fuel cell with a continuous source of oxygen and hydrogen gas. However, with atmospheric air as the direct source of oxygen to the cathode channel, performance of PEM fuel cells is severely impaired by the low partial pressure of oxygen and the concentration polarization of nitrogen, while alkaline fuel cells require a pretreatment purification system to remove carbon dioxide from the feed air. Further, as the average oxygen concentration in a cathode channel with atmospheric air feed is typically only about 15%, the size of the fuel cell must be undesirably large in order to provide sufficient power for industrial applications.

In order to achieve a partial pressure of oxygen through the cathode channel sufficient for the attainment of competitive current densities from a PEM fuel cell system, particularly for vehicular propulsion, it is necessary to compress the air feed to at least 3 atmospheres before the air feed is introduced to the cathode channel. As will be appreciated, the power input necessary to sufficiently compress the air feed reduces the overall efficiency of the fuel cell system. It has been proposed to use polymeric membranes to enrich the oxygen, but such membranes actually reduce the oxygen partial pressure and the reduction in total pressure more than offsets the limited enrichment attainable.

External production, purification, dispensing and storage of hydrogen (either as compressed gas or cryogenic liquid) requires costly infrastructure, while storage of hydrogen fuel on vehicles presents considerable technical and economic barriers. Accordingly, for stationary power generation, it is preferred to generate hydrogen from natural gas by steam reforming or partial oxidation followed by water gas shift. For fuel cell vehicles using a liquid fuel, it is preferred to generate hydrogen from methanol by steam reforming or from gasoline by partial oxidation of autothermal reforming, again followed by water gas shift. However, the resulting hydrogen contains carbon monoxide and carbon dioxide impurities which cannot be tolerated respectively by the PEM fuel cell catalytic electrodes and the alkaline fuel cell electrolyte in more than trace levels.

In prior art PEM fuel cells operating with an autothermal or partial oxidation fuel processor, ambient air is used as the oxidant. This results in a large load of nitrogen having to be heated and then cooled through the fuel processor system. The substantial volume of nitrogen contributes to pressure losses throughout the fuel processor and anode channels, or alternatively to the cost and physical bulk penalties of making those passages larger.

While water recovery from fuel cell exhaust is highly desirable for efficient fuel processor operation, the conventional fuel cell discharges its oxygen-depleted cathode exhaust gas to atmosphere, and thus requires an extra condenser to recover water which then must be vaporized in the fuel processor at a substantial energy cost. This condenser adds to the radiator cooling load which is already a problem for automotive fuel cell power plants in view of the large amount of low grade heat which must be rejected.

The conventional method of removing residual carbon monoxide from the hydrogen feed to PEM fuel cells has been catalytic selective oxidation, which compromises efficiency as both the carbon monoxide and a fraction of the hydrogen are consumed by low temperature oxidation, without any recovery of the heat of combustion. Palladium diffusion membranes can be used for hydrogen purification, but have the disadvantages of delivery of the purified hydrogen at low pressure, and also the use of rare and costly materials.

Pressure swing adsorption systems (PSA) have the attractive features of being able to provide continuous sources of oxygen and hydrogen gas, without significant contaminant levels. PSA systems and vacuum pressure swing adsorption systems (vacuum-PSA) separate gas fractions from a gas mixture by coordinating pressure cycling and flow reversals over an adsorbent bed which preferentially adsorbs a more readily adsorbed gas component relative to a less readily adsorbed gas component of the mixture. The total pressure of the gas mixture in the adsorbent bed is elevated while the gas mixture is flowing through the adsorbent bed from a first end to a second end thereof, and is reduced while the gas mixture is flowing through the adsorbent from the second end back to the first end. As the PSA cycle is repeated, the less readily adsorbed component is concentrated adjacent the second end of the adsorbent bed, while the more readily adsorbed component is concentrated adjacent the first end of the adsorbent bed. As a result, a "light" product (a gas fraction depleted in the more readily adsorbed component and enriched in the less readily adsorbed component) is delivered from the second end of the bed, and a "heavy" product (a gas fraction enriched in the more strongly adsorbed component) is exhausted from the first end of the bed.

However, the conventional system for implementing pressure swing adsorption or vacuum pressure swing adsorption uses two or more stationary adsorbent beds in parallel, with directional valving at each end of each adsorbent bed to connect the beds in alternating sequence to pressure sources and sinks. This system is often difficult and expensive to implement due to the complexity of the valving required.

Further, the conventional PSA system makes inefficient use of applied energy, because feed gas pressurization is provided by a compressor whose delivery pressure is the highest pressure of the cycle. In PSA, energy expended in compressing the feed gas used for pressurization is then dissipated in throttling over valves over the instantaneous pressure difference between the absorber and the high pressure supply. Similarly, in vacuum-PSA, where the lower pressure of the cycle is established by a vacuum pump exhausting gas at that pressure, energy is dissipated in throttling over valves during countercurrent blowdown of adsorbers whose pressure is being reduced. A further energy dissipation in both systems occurs in throttling of light reflux gas used for purge, equalization, concurrent blowdown and product pressurization or backfill steps. These energy sinks reduce the overall efficiency of the fuel cell system.

Additionally, conventional PSA systems can generally only operate at relatively low cycle frequencies, necessitating the use of large adsorbent inventories. The consequent large size and weight of such PSA systems renders them unsuitable for vehicular fuel cell applications. Thus, a conventional PSA unit for oxygen concentration would require an adsorbent bed volume of about 400 L, and an additional installed volume of about 100 L for pressure enclosures and PSA cycle control valves, in order to deliver a product flow containing about 200 L/min oxygen which would be sufficient for a 40 kW fuel cell.

Accordingly, there remains a need for an efficient fuel cell-based electrical generation system which can produce sufficient power for industrial applications and which is suitable for vehicular applications. There also remains a need for compact, lightweight hydrogen and oxygen PSA systems that operate at higher cycle frequencies and are suitable for vehicular fuel cell-based applications.

SUMMARY OF THE INVENTION

According to the invention, there is provided a fuel cell-based electrical generation system which addresses the deficiencies of the prior art fuel cell electrical generation systems.

The electrical current generating system, according to a first embodiment of the present invention, comprises a fuel cell, and an oxygen gas delivery system. The fuel cell includes an anode channel having an anode gas inlet for receiving a supply of hydrogen gas, a cathode channel having a cathode gas inlet and a cathode gas outlet, and an electrolyte in communication with the anode and cathode channel for facilitating ion exchange between the anode and cathode channel. The oxygen gas delivery system is coupled to the cathode gas inlet and delivers oxygen gas to the cathode channel.

The electrical current generating system also includes gas recirculation means coupled to the cathode gas outlet for recirculating a portion of cathode exhaust gas (which is still enriched in oxygen relative to ambient air, and carries fuel cell exhaust water and fuel cell waste heat) from the cathode gas outlet to the cathode gas inlet.

In some embodiments, at least a portion of the cathode exhaust gas is returned to the inlet of an autothermal or partial oxidation fuel processor (or reformer) for reacting a hydrocarbon fuel with oxygen and steam in order to generate raw hydrogen or syngas.

In a preferred implementation of the first embodiment, the oxygen gas delivery system comprises an oxygen gas separation system for extracting enriched oxygen gas from air. Preferably, the oxygen gas separating system comprises an oxygen pressure swing adsorption system including a rotary module having a stator and a rotor rotatable relative to the stator. The rotor includes a number of flow paths for receiving adsorbent material therein for preferentially adsorbing a first gas component in response to increasing pressure in the flow paths relative to a second gas component. The pressure swing adsorption system also includes compression machinery coupled to the rotary module for facilitating gas flow through the flow paths for separating the first gas component from the second gas component. The stator includes a first stator valve surface, a second stator valve surface, and plurality of function compartments opening into the stator valve surfaces. The function compartments include a gas fee compartment, a light reflux exit compartment and a light reflux return compartment.

In one variation, the compression machinery comprises a compressor for delivering pressurized air to the gas feed compartment, and a light reflux expander coupled between the light reflux exit compartment and the light reflux compartment. The gas recirculating means comprises a compressor coupled to the light reflux expander for supplying oxygen gas, exhausted from the cathode gas outlet, under pressure to the cathode gas inlet. As a result, energy recovered from the pressure swing adsorption system can be applied to boost the pressure of oxygen gas delivered to the cathode gas inlet.

In another variation, restrictor orifices are disposed between the light reflux exit compartment and the light reflux return compartment for pressure letdown in replacement of the light reflux expander. The gas recirculating means comprises a compressor coupled to the cathode gas outlet for supplying oxygen gas to the cathode gas inlet, and a restrictive orifice disposed between the cathode gas outlet and a pressurization compartment for recycling a portion of the oxygen gas as feed gas to the pressure swing adsorption system. As a result, energy recovered from the cathode gas outlet can be used to help pressurize the cathode gas inlet through the PSA system.

The electrical current generating system, according to a second embodiment of the present invention, comprises a fuel cell, an oxygen gas delivery system, and a hydrogen gas delivery system. The fuel cell includes an anode channel having an anode gas inlet and an anode gas outlet, a cathode channel having a cathode gas inlet and a cathode gas outlet, and an electrolyte in communication with the anode and cathode channel for facilitating ion exchange between the anode and cathode channel.

The oxygen gas delivery system is coupled to the cathode gas inlet and delivers oxygen gas to the cathode channel. The hydrogen gas delivery system includes a hydrogen gas inlet for receiving a first hydrogen gas feed from the anode gas outlet, and a hydrogen gas outlet coupled to the anode gas inlet for delivering hydrogen gas received from the first hydrogen gas feed to the anode channel with increased purity.

In a preferred implementation of the second embodiment, the oxygen gas separation system comprises an oxygen pressure swing adsorption system, and the hydrogen gas separation system comprises a reactor for producing a second hydrogen gas fee from hydrocarbon fuel, and a hydrogen pressure swing adsorption system coupled to the reactor for purifying hydrogen gas received from the first and second hydrogen gas feeds. Both pressure swing adsorption systems include a rotary module having a stator and a rotor rotatable relative to the stator. The rotor includes a number of flow paths for receiving adsorbent material therein for preferentially adsorbing a first gas component in response to increasing pressure in the flow paths relative to a second gas component. The function compartments include a gas feed compartment and a heavy product compartment.

In one variation, the oxygen pressure swing adsorption system includes a compressor coupled to the gas feed compartment for delivering pressurized air to the gas feed compartment, and a vacuum pump coupled to the compressor for extracting nitrogen product gas from the heavy product compartment. The reactor comprises a steam reformer, including a burner, for producing syngas, and a water gas shift reactor coupled to the steam reformer for converting the syngas to the second hydrogen gas feed. The hydrogen pressure swing adsorption system includes a vacuum pump for delivering fuel gas from the heavy product compartment to the burner. The fuel gas is burned in the burner, and the heat generated therefrom is used to supply the endothermic heat of reaction necessary for the steam reformer reaction. The resulting syngas is delivered to the water gas shift reactor for removal of impurities, and then delivered as the second hydrogen gas feed to the hydrogen pressure swing adsorption system.

In another variation, the invention includes a burner for burning fuel. The reactor comprises an autothermal reformer for producing syngas, and a water gas shift reactor coupled to the autothermal reformer for converting the syngas to the second hydrogen gas fee. The compressor of the oxygen pressure swing adsorption system delivers pressurized air to the burner, and the heavy product gas is delivered from the hydrogen pressure swing adsorption system as tail gas to be burned in the burner. The compression machine of the oxygen pressure swing adsorption system also includes an expander coupled to the compressor for driving the compressor from hot gas of combustion emitted from the burner. Heat from the burner may also be used to preheat air and/or fuel supplied to the autothermal reformer.

BRIEF DESCRIPTION OF THE DRAWINGS

The preferred embodiment of the present invention will now be described, by way of example only, with reference to the drawings, in which.

DETAILED DESCRIPTION OF THE PREFERRED EMBODIMENTS

Figure 1:
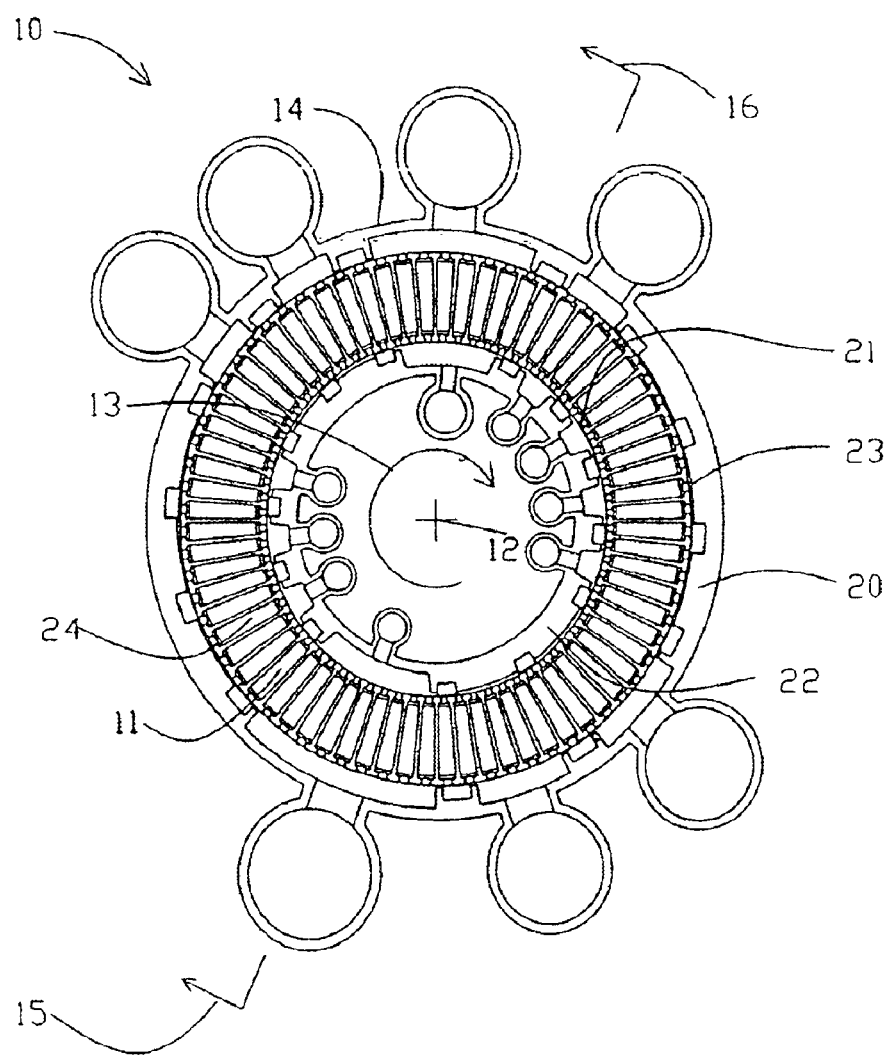
FIG. 1 is a sectional view of a rotary PSA module suitable for use with the present invention, showing the stator and rotor situated in the stator.

To aid in understanding the present invention, a pressure swing adsorption process and associated apparatus, suitable for use with the present invention, will be described first, with reference to FIGS. 1 through 6. Thereafter, an oxygen-separating pressure swing adsorption system and a hydrogen-separating pressure swing adsorption system will be described with reference to FIGS. 7 and 8 respectively. Two embodiments of the invention, together with variations thereon, will then be described commencing with FIG. 9.

FIGS. 1, 2, 3 and 4

A rotary module 10 which is suitable for use as part of the present invention is shown in FIGS. 1, 2, 3 and 4. The module includes a rotor 11 revolving about axis 12 in the direction shown by arrow 13 within stator 14. However, it should be understood that the invention is not limited to PSA systems having rotary modules. Rather other arrangements may be employed without departing from the scope of the invention. For instance, if desired, the present invention may be employed with multiple stationary adsorbent beds in parallel, with directional valving at each of each adsorbent bed to connect the beds in alternating sequence to pressure sources and sinks. However, as will become apparent, the rotary module 10 is preferred since it provides highly desirable features of efficiency and compactness.

Rotary PSA modules include those with rotating absorber modules to provide the rotary valve function, and those with a fixed absorber module cooperating with rotating valves, preferably coaxial to the absorber module. In a particular embodiment, the rotary PSA module is a cylindrical axial flow absorber module, with feed and product rotary valve faces at opposite ends of the absorber module. The absorber module may rotate or remain stationary, the later version including fluid transfer between the casing and the rotating valve rotors.

In general, the rotary module 10 may be configured for flow through the absorber elements in the radial, axial or oblique conical directions relative to the rotor axis. For operation at high cycle frequency, radial flow has the advantage that the centripetal acceleration will lie parallel to the flow path for most favorable stabilization of buoyancy-driven free convection. Radial flow configurations may be preferred for large module capacities.

Axial flow configurations may be preferred for smaller module capacities, and advantageously allow increased compactness of fuel cell systems that incorporate PSA systems, at least for smaller power ratings below about 300 kW. Compactness is an important consideration for enabling practicable use of PSA systems in automotive fuel cell power plants.

Figure 2:
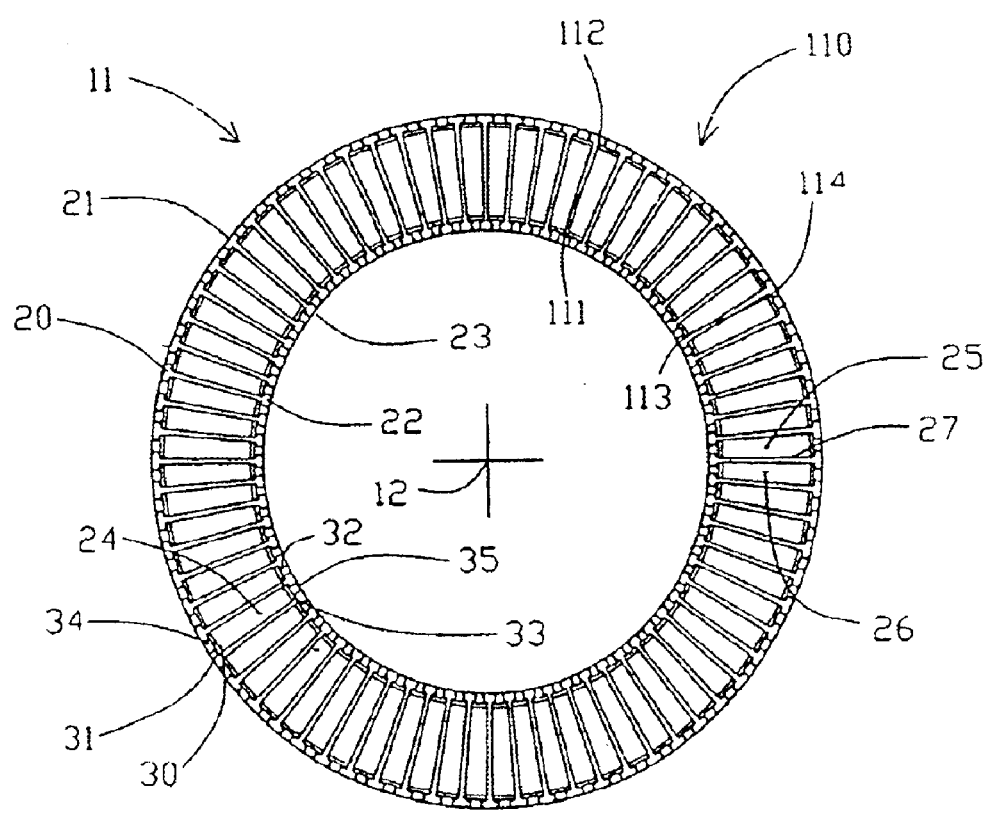
FIG. 2 is a sectional view of the module of FIG. 1, with the stator deleted for clarity.

As shown in FIG. 2, the rotor 11 is of annular section, having concentrically to axis 12 an outer cylindrical wall 20 whose external surface is first valve surface 21, and an inner cylindrical wall 22 whose internal surface is second valve surface 23. The rotor has (in the plane of the section defined by arrows 15 and 16 in FIG. 4) a total of "N" radial flow absorber elements 24. An adjacent pair of absorber elements 25 and 26 are separated by partition 27 which is structurally and sealingly joined to outer wall 20 and inner wall 22. Adjacent absorber elements 25 and 26 are angularly spaced relative to axis 12 by an angle of 360°/N. Since the absorber elements and the valve surfaces are thereby integrated into a single unit, and the absorber elements are located in close proximity to the valve surfaces with minimal dead volume, the rotary module 10 is more compact and efficient than conventional PSA systems.

Absorber element 24 has a first end 30 defined by support screen 31 and a second end 32 defined by support screen 33. The absorber may be provided as granular adsorbent, whose packing voidage defines a flow path contacting the adsorbent between the first and second ends of the absorber. However, as described in copending U.S. patent application Ser. No. 08/995,906, the description therein being incorporated herein by reference, preferably the absorber element is provided as an array of laminated thin sheets extending between the first and second ends of the absorber, the sheets having an adsorbent such as a zeolite supported on a reinforcement matrix, and with flow channels established by spacers between the sheets. The laminated sheet absorber, with sheet thickness of approximately 150 microns and using type X zeolites, has greatly reduced mass transfer and pressure drop resistances compared to conventional granular adsorbers, so that satisfactory oxygen enrichment operation has been achieved with PSA cycle periods in the order of 1 second and as low as 0.4 second. Consequently, the adsorbent inventory is radically reduced compared to conventional PSA cycle periods of about 1 minute, with the size of the module being smaller by some two orders of magnitude compared to conventional PSA equipment of equivalent capacity. As a result, an exceptionally compact PSA module that can be used, rendering the invention particularly suitable for vehicular fuel cell power plants.

First aperture or orifice 34 provides flow communication from first valve surface 21 through wall 20 to the first end 30 of absorber 24. Second aperture or orifice 35 provides flow communication from second valve surface 23 through wall 22 to the second end 31 of absorber 24. Support screens 31 and 33 respectively provide flow distribution 32 between first aperture 34 and first end 30, and between second aperture 35 and second end 32, of absorber element 24.

Figure 3:
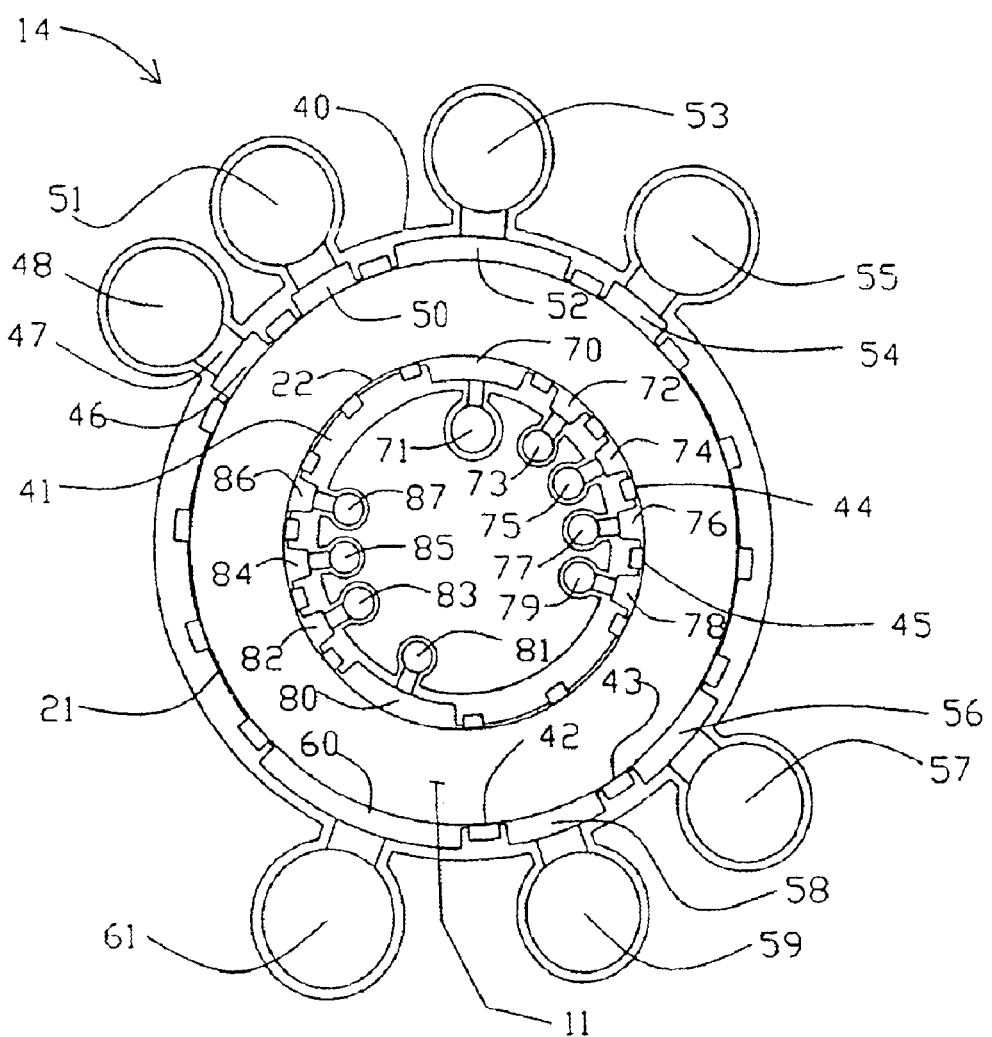
FIG. 3 is a sectional view of the stator shown in FIG. 1, with the rotor deleted for clarity.

As shown in FIG. 3, stator 14 is a pressure housing including an outer cylindrical shell or first valve stator 40 outside the annular rotor 11, and an inner cylindrical shell or second valve stator 41 inside the annular rotor 11. Outer shell 40 carries axially extending strip seals (e.g. 42 and 43) sealingly engaged with first valve surface 21, while inner shell 41 carries axially extending strip seals (e.g. 44 and 45) sealingly engaged with second valve surface 23. Preferably, the azimuthal sealing width of the strip seals is greater than the diameters or azimuthal widths of the first and second apertures 34 and 35 opening through the first and second valve surfaces.

A set of first compartments in the outer shell each open in an annular sector to the first valve surface, and each provide fluid communication between its angular sector of the first valve surface and a manifold external to the module. The angular sectors of the compartments are much wider than the angular separation of the absorber elements. The first compartments are separated on the first sealing surface by the strip seals (e.g. 42). Proceeding clockwise in FIG. 3, in the direction of rotor rotation, a first feed pressurization compartment 46 communicates by conduit 47 to first feed pressurization manifold 48, which is maintained at a first intermediate feed pressure. Similarly, a second feed pressurization compartment 50 communicates to second feed pressurization manifold 51, which is maintained at a second intermediate feed pressure higher than the first intermediate feed pressure but less than the higher working pressure.

For greater generality, module 10 is shown with provision for sequential admission of two feed mixtures, the first feed gas having a lower concentration of the more readily adsorbed component relative to the second feed gas. First feed compartment 52 communicates to first feed manifold 53, which is maintained at substantially the higher working pressure. Likewise, second feed compartment 54 communicates to second feed manifold 55, which is maintained at substantially the higher working pressure. A first countercurrent blowdown compartment 56 communicates to first countercurrent blowdown manifold 57, which is maintained at a first countercurrent blowdown intermediate pressure. A second countercurrent blowdown compartment 58 communicates to second countercurrent blowdown manifold 59, which is maintained at a second countercurrent blowdown intermediate pressure above the lower working pressure. A heavy product compartment 60 communicates to heavy product exhaust manifold 61 which is maintained at substantially the lower working pressure. It will be noted that compartment 58 is bounded by strip seals 42 and 43, and similarly all the compartments are bounded and mutually isolated by strip seals.

A set of second compartments in the inner shell each open in an angular sector to the second valve surface, and each provide fluid communication between its angular sector of the second valve surface and a manifold external to the module. The second compartments are separated on the second sealing surface by the strip seals (e.g. 44). Proceeding clockwise in FIG. 3, again in the direction of rotor rotation, light product compartment 70 communicates to light product manifold 71, and receives high product gas at substantially the higher working pressure, less frictional pressure drops through the adsorbers and the first and second orifices. According to the angular extension of compartment 70 relative to compartment 52 and 54, the light product may be obtained only from adsorbers simultaneously receiving the first feed gas from compartment 52, or from adsorbers receiving both the first and second feed gases.

A first light reflux exit compartment 72 communicates to first light reflux exit manifold 73, which is maintained at a first light reflux exit pressure, here substantially the higher working pressure less frictional pressure drops. A first concurrent blowdown compartment 74 (which is actually the second light reflux exit compartment), communicates to second light reflux exit manifold 75, which is maintained at a first concurrent blowdown pressure less than the higher working pressure. A second concurrent blowdown compartment or third light reflux exit compartment 76 communicates to third light reflux exit manifold 77, which is maintained at a second concurrent blowdown pressure less than the first concurrent blowdown pressure. A third concurrent blowdown compartment or fourth light reflux exit compartment 78 communicates to fourth light reflux exit manifold 79, which is maintained at a third concurrent blowdown pressure less than the second concurrent blowdown pressure.

A purge compartment 80 communicates to a fourth light reflux return manifold 81, which supplies the fourth light reflux gas which has been expanded form the third concurrent blowdown pressure to substantially the lower working pressure with an allowance for frictional pressure drops. The ordering of light reflux pressurization steps is inverted from the ordering or light reflux exit or concurrent blowdown steps, so as to maintain a desirable "last out—first in" stratification of light reflux gas packets. Hence a first light reflux pressurization compartment 82 communicates to a third light reflux return manifold 83, which supplies the third light reflux gas which has been expanded from the second concurrent blowdown pressure to a first light reflux pressurization pressure greater than the lower working pressure. A second light reflux pressurization compartment 84 communicates to a second light reflux return manifold 85, which supplies the second light reflux gas which has been expanded from the first concurrent blowdown pressure to a second light reflux pressurization pressure greater than the first light reflux pressurization pressure. Finally, a third light reflux pressurization compartment 86 communicates to a first light reflux return manifold 87, which supplies the first light reflux gas which has been expanded from approximately the higher pressure to a third light reflux pressurization pressure greater than the second light reflux pressurization pressure, and in this example less than the first feed pressurization pressure.

Figure 4:
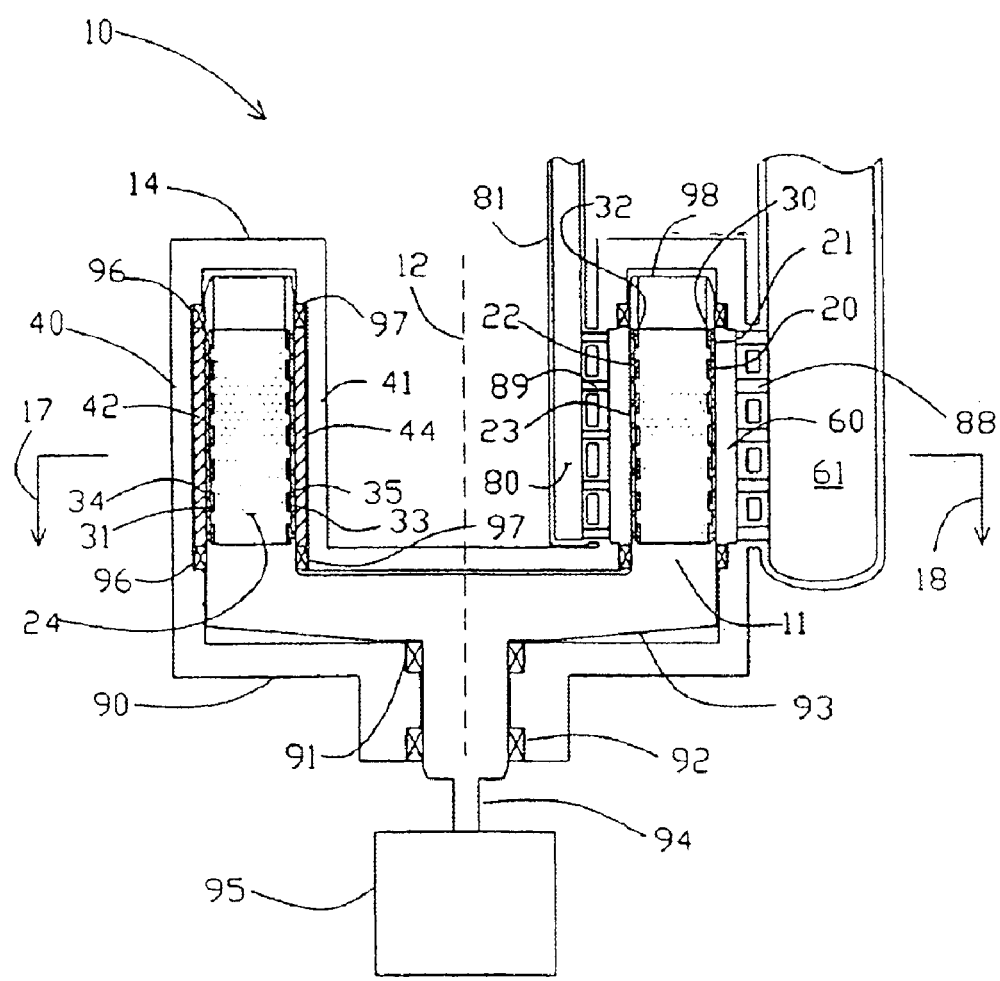
FIG. 4 is an axial section of the module of FIG. 1.

Additional details are shown in FIG. 4. Conduits 88 connect first compartment 60 to manifold 61, with multiple conduits providing for good axial flow distribution in compartment 60. Similarly, conduits 89 connect second compartment 80 to manifold 81. Stator 14 has base 90 with bearings 91 and 92. Motor 95 is coupled to shaft 94 to drive rotor 11. The rotor could alternatively rotate as an annular drum, supported by rollers at several angular positions about its rim and also driven at its rim so that no shaft would be required. A rim drive could be provided by a ring gear attached to the rotor, or by a linear electromagnetic motor whose stator would engage an arc of the rim. Particularly for hydrogen separation applications, the rotor drive may be hermetically enclosed within the stator housing to eliminate hazards related to seal leakage. Outer circumferential seals 96 seal the ends of outer strip seals 42 and the edges of first valve surface 21, while inner circumferential seals 97 seal the ends of inner strip seals 44 and the edges of second valve surface 23. Rotor 11 has access plug 98 between outer wall 20 and inner wall 22, which provides access for installation and removal of the adsorbent in adsorbers 24.

Figure 5:
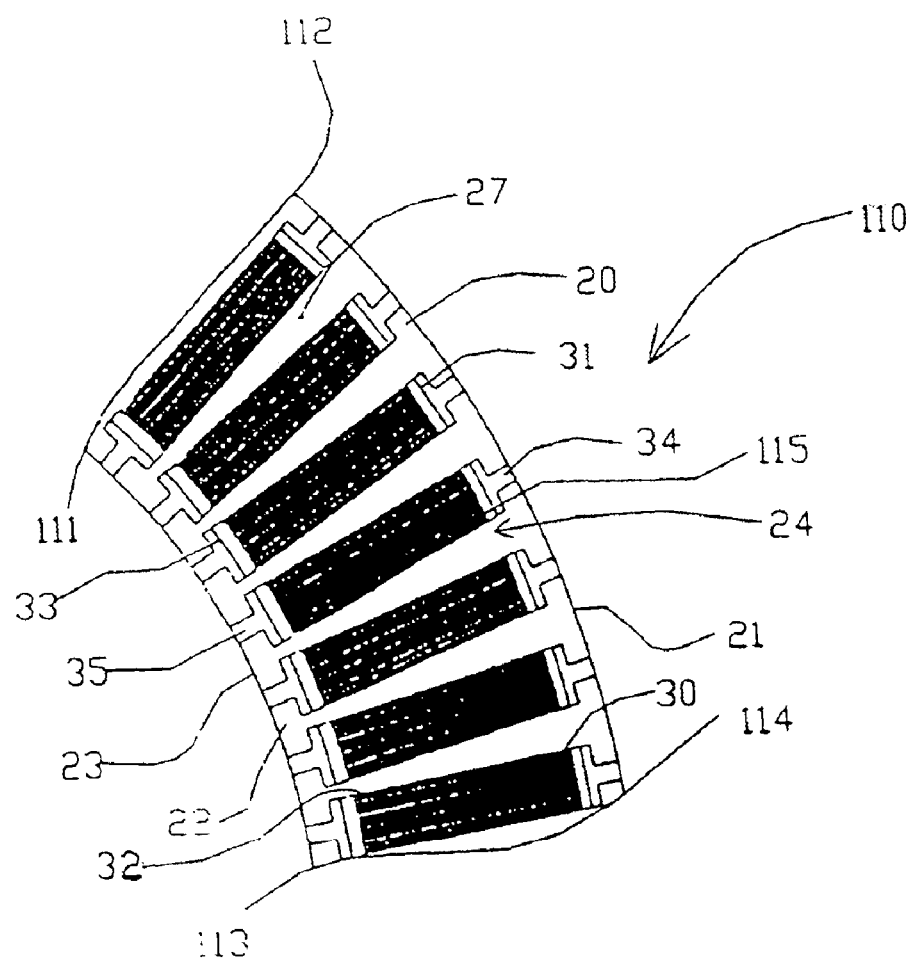
FIG. 5 shows a typical PSA cycle attainable with the PSA system shown in FIGS. 1 to 4.
Figure 6:
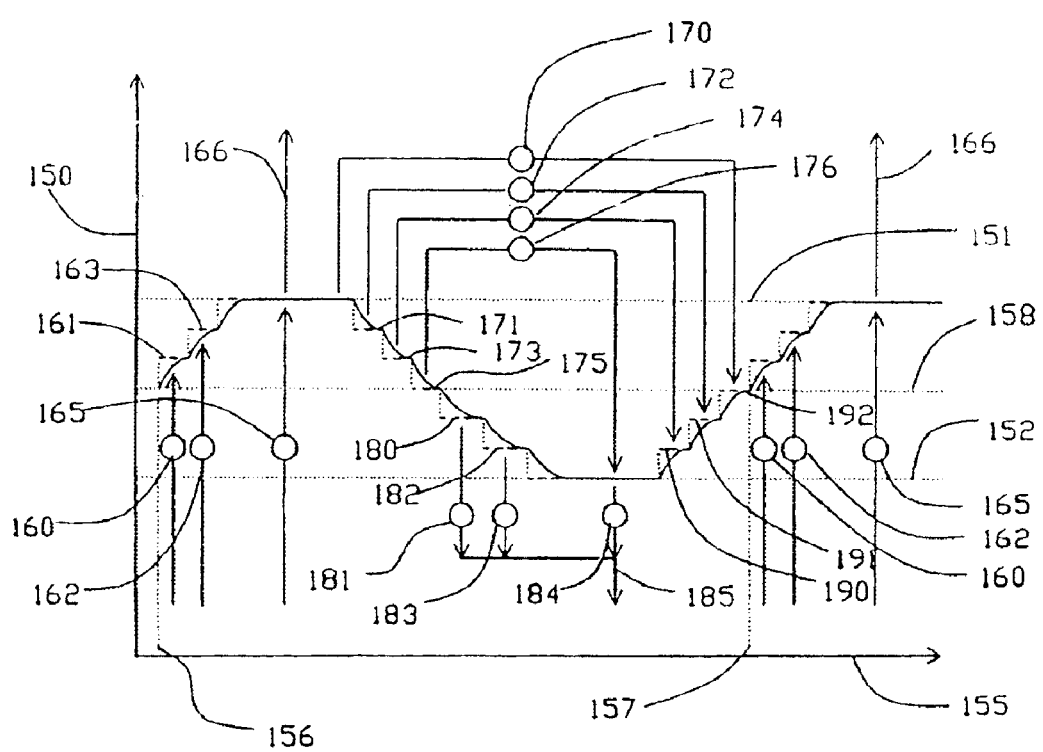
FIG. 6 shows one variation of the PSA cycle with heavy reflux, attainable with the PSA system shown in FIGS. 1 to 4.

FIGS. 5 and 6

FIG. 5 shows a typical PSA cycle which would be obtained using the foregoing gas separation system, while FIG. 6 shows a similar PSA cycle with heavy reflux recompression of a portion of the first product gas to provide a second feed gas to the process.

In FIGS. 5 and 6, the vertical axis 150 indicates the working pressure in the adsorbers and the pressure in the first and second compartments. Pressure drops due to flow within the absorber elements are neglected. The higher and lower working pressures are respectively indicated by dotted lines 151 and 152. The lower working pressure may be nominally or approximately ambient atmospheric pressure, or may be a subatmospheric pressure established by vacuum pumping. The higher working pressure may typically be in the range of twice to four times the lower working pressure, based on the ratio of absolute pressures.

The horizontal axis 155 of FIGS. 5 and 6 indicates time, with the PSA cycle period defined by the time interval between points 156 and 157. At times 156 and 157, the working pressure in a particular absorber is pressure 158. Starting from time 156, the cycle for a particular absorber (e.g. 24) begins as the first aperture 34 of that absorber is opened to the first feed pressurization compartment 46, which is fed by first feed supply means 160 at the first intermediate feed pressure 161. The pressure in that absorber rises from pressure 158 at time 157 to the first intermediate feed pressure 161. Proceeding ahead, first aperture passes over a seal strip, first closing absorber 24 to compartment 46 and then opening it to second feed pressurization compartment 50 which is feed by second feed supply means 162 at the second intermediate feed pressure 163. The absorber pressure rises to the second intermediate feed pressure.

First aperture 34 of absorber 24 is opened next to first feed compartment 52, which is maintained at substantially the higher pressure by a third feed supply means 165. Once the absorber pressure has risen to substantially the higher working pressure, its second aperture 35 (which has been closed to all second compartments since time 156) opens to light product compartment 70 and delivers light product 166.

In the cycle of FIG. 6, first aperture 34 of absorber 24 is opened next to second feed compartment 54, also maintained at substantially the higher pressure by a fourth feed supply means 167. In general, the fourth feed supply means supplies a second feed gas, typically richer in the more readily adsorbed component than the first feed gas provided by the first, second and third feed supply means. In the specific cycle illustrated in FIG. 6, the fourth feed supply means 167 is a "heavy reflux" compressor, recompressing a portion of the heavy product back into the apparatus. In the cycle illustrated in FIG. 5, there is no fourth feed supply means, and compartment 54 could be eliminated or consolidated with compartment 52 extended over a wider angular arc to the stator.

While feed gas is still being supplied to the first end of absorber 24 from either compartment 52 or 54, the second end of absorber 24 is closed to light product compartment 70 and opens to first reflux exit compartment 72 while delivering "light reflux" gas (enriched in the less readily adsorbed component, similar to second product gas) to first light reflux pressure let-down means (or expander) 170. The first aperture 34 of absorber 24 is then closed to all first compartments, while the second aperture 35 is opened successively to (a) second light reflux exit compartment 74, dropping the absorber pressure to the first concurrent blowdown pressure 171 while delivering light reflux gas to second light reflux pressure letdown means 172, (b) third light reflux exit compartment 76, dropping the absorber pressure to the second concurrent blowdown pressure 173 while delivering light reflux gas to third light reflux pressure letdown means 174, and (c) fourth light reflux exit compartment 78, dropping the absorber pressure to the third concurrent blowdown pressure 175 while delivering light reflux gas to fourth light reflux pressure letdown means 176. Second aperture 35 is then closed for an interval, until the light reflux return steps following the countercurrent blowdown steps.

The light reflux pressure let-down means may be mechanical expanders or expansion stages for expansion energy recovery, or may be restrictor orifices or throttle valves for irreversible pressure let-down.

Either when the second aperture is closed after the final light reflux exit step (as shown in FIGS. 5 and 6), or earlier while light reflux exit steps are still underway, first aperture 34 is opened to first countercurrent blowdown compartment 56, dropping the absorber pressure to the first countercurrent blowdown intermediate pressure 180 while releasing "heavy" gas (enriched in the more strongly adsorbed component) to first exhaust means 181. Then, first aperture 34 is opened to second countercurrent blowdown compartment 58, dropping the absorber pressure to the first countercurrent blowndown intermediate pressure 182 while releasing heavy gas to second exhaust means 183. Finally reaching the lower working pressure, first aperture 34 is opened to heavy product compartment 60, dropping the absorber pressure to the lower pressure 152 while releasing heavy gas to third exhaust means 184. Once the absorber pressure has substantially reached the lower pressure while first aperture 34 is open to compartment 60, the second aperture 35 opens to purge compartment 80, which receives fourth light reflux gas from fourth light reflux pressure let-down means 176 in order to displace more heavy gas into first product compartment 60.

In FIG. 5, the heavy gas from the first, second and third exhaust means is delivered as the heavy product 185. In FIG. 6, this gas is partly released as the heavy product 185, while the balance is redirected as "heavy reflux" 187 to the heavy reflux compressor as fourth feed supply means 167. Just as light reflux enables an approach to high purity of the less readily adsorbed ("light") component in the light product, heavy reflux enables an approach to high purity of the more readily adsorbed ("heavy") component in the heavy product so that high recovery of the less readily adsorbed ("light") product can be achieved.

The absorber is then repressurized by light reflux gas after the first and second apertures close to compartments 60 and 80. In succession, while the first aperture 34 remains closed at least initially, (a) the second aperture 35 is opened to first light reflux pressurization compartment 82 to raise the absorber pressure to the first light reflux pressurization pressure 190 while receiving third light reflux gas from the third reflux pressure letdown means 174, (b) the second aperture 35 is opened to second light reflux pressurization compartment 84 to raise the absorber pressure to the second light reflux pressurization pressure 191 while receiving second light reflux gas from the second light reflux pressure letdown means 172, and (c) the second aperture 35 is opened to third light reflux pressurization compartment 86 to raise the absorber pressure to the third light reflux pressurization pressure 192 while receiving first light reflux gas from the first light reflux pressure letdown means 170. Unless feed pressurization has already been started while light reflux return for light reflux pressurization is still underway, the process (as based on FIGS. 5 and 6) begins feed pressurization for the cycle after time 157 as soon as the third light reflux pressurization step has been concluded.

The pressure variation waveform in each absorber would be a rectangular staircase if there were no throttling in the first and second valves. Such throttling is needed to smooth pressure and flow transients. In order to provide balanced performance, preferably all of the absorber elements and the apertures are closely identical to each other.

The rate of pressure change in each pressurization or blowdown step will be restricted by throttling in ports (or in clearance or labyrinth sealing gaps) of the first and second valve means, or by throttling in the apertures at first and second ends of the adsorbers, resulting in the typical pressure waveform depicted in FIGS. 5 and 6. Alternatively, the apertures may be opened slowly by the seal strips, to provide flow restriction throttling between the apertures and the seal strips, which may have narrow tapered clearance channels so that the apertures are only opened to full flow gradually. Excessively rapid rates of pressure change would subject the absorber to mechanical stress, while also causing flow transients which would tend to increase axial dispersion of the concentration wavefront in the absorber. Pulsations of flow and pressure are minimized by having a plurality of adsorbers simultaneously transiting each step of the cycle, and by providing enough volume in the function compartments and associated manifolds so that they act effectively as surge adsorbers between the compression machinery and the first and second valve means.

It will be evident that the cycle could be generalized in many variations by having more or fewer intermediate stages in each major step of feed pressurization, countercurrent blowdown exhaust, or light reflux. If desired, combined feed and product pressurization steps (or combined concurrent and countercurrent blowdown steps) at intermediate pressures may be performed from both first and second valves simultaneously. The pressure at which feed pressurization begins, may differ from the pressure at which countercurrent blowdown begins. Furthermore, in air separation or air purification applications, a stage of feed pressurization (typically the first stage) could be performed by equalization with atmosphere as an intermediate pressure of the cycle. Similarly, a stage of countercurrent blowdown could be performed by equalization with atmosphere as an intermediate pressure of the cycle.

FIG. 7

Figure 7:
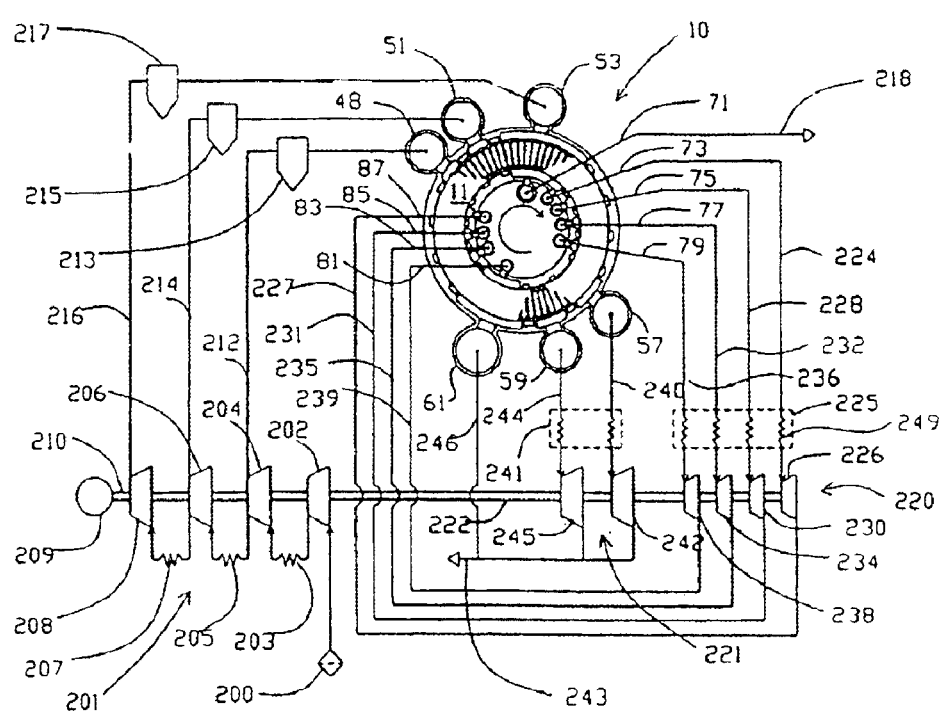
FIG. 7 shows a pressure swing adsorption apparatus for separating oxygen gas from air, suitable for use with the present invention, and depicting the rotary module shown in FIG. 1 and a compression machine coupled to the rotary module.

FIG. 7 is a simplified schematic of a PSA system for separating oxygen from air using nitrogen-selective zeolite adsorbents. The light product is concentrated oxygen, while the heavy product is nitrogen-enriched air usually vented as waste. The cycle lower pressure 152 is illustrated as nominally atmospheric pressure, although a vacuum pressure 152 could be used as will be illustrated in FIG. 8. Feed air is introduced through filter intake 200 to a feed compressor 201. The feed compressor includes compressor first stage 202, intercooler 203, compressor second stage 204, second intercooler 205, compressor third stage 206, third intercooler 207, and compressor fourth stage 208. The feed compressor 201 as described may be a four stage axial compressor with motor 209 as prime mover coupled by shaft 210. The intercoolers are optional. With reference to FIG. 5, the feed compressor first and second stages are the first feed supply means 160, delivering feed gas at the first intermediate feed pressure 161 via conduit 212 and water condensate separator 213 to first feed pressurization manifold 48. Feed compressor third stage 206 is the second feed supply means 162, delivering feed gas at the second intermediate feed pressure 163 via conduit 214 and water condensate separator 215 to second feed pressurization manifold 51. Feed compressor fourth stage 208 is the third feed supply means 165, delivering feed gas at the higher pressure 151 via conduit 216 and water condensate separator 217 to feed manifold 53. Light product oxygen flow is delivered from light product manifold 71 by conduit 218, maintained at substantially the higher pressure less frictional pressure drops.

The PSA system of FIG. 7 includes energy recovery expanders, including light reflux expander 220 (here including four stages) and countercurrent blowdown expander 221 (here including two stages), coupled to feed compressor 201 by shaft 222. The expander stages may be provided for example as radial inflow turbine stages, as full admission axial turbine stages with separate wheels, or as partial admission impulse turbine stages combined in a single wheel.

Light reflux gas from first light reflux exit manifold 73 flows at the higher pressure via conduit 224 and heater 225 to first light pressure letdown means 170 which here is first light reflux expander stage 226, and then flows at the third light reflux pressurization pressure 192 by conduit 227 to the first light reflux return manifold 87. Light reflux gas from second light reflux exit manifold 75 flows at the first concurrent blowdown pressure 171 via conduit 228 and heater 225 to second light reflux pressure letdown means 172, here the second expander stage 230, and then flows at the second light reflux pressurization pressure 191 by conduit 231 to the second light reflux return manifold 85. Light reflux gas from third light reflux exit manifold 77 flows at the second concurrent blowdown pressure 173 via conduit 232 and heater 225 to third light reflux pressure pressurization pressure 190 by conduit 235 to the third light reflux return manifold 83. Finally, light reflux gas from fourth light reflux exit manifold 79 flows at the third concurrent blowdown pressure 175 via conduit 236 and heater 225 to fourth light reflux pressure letdown means 176, here the fourth light reflux expander stage 238, and then flows at substantially the lower pressure 152 by conduit 239 to the fourth light reflux return manifold 81.

Heavy countercurrent blowdown gas from first countercurrent blowdown manifold 57 flows at first countercurrent blowdown intermediate pressure 180 by conduit 240 to heater 241 and thence to first stage 242 of the countercurrent blowdown expander 221 as first exhaust means 181, and is discharged from the expander to exhaust manifold 243 at substantially the lower pressure 152. Countercurrent blowdown gas from second countercurrent blowdown manifold 59 flows at second countercurrent blowdown intermediate pressure 182 by conduit 244 to heater 241 and thence to second stage 245 of the countercurrent blowdown expander 221 as second exhaust means 183, and is discharged from the expander to exhaust manifold 243 at substantially the lower pressure 152. Finally, heavy gas from heavy product exhaust manifold 61 flows by conduit 246 as third exhaust means 184 to exhaust manifold 243 delivering the heavy product gas 185 to be vented at substantially the lower pressure 152.

Optional heaters 225 and 241 raise the temperatures of gases entering expanders 220 and 221, thus augmenting the recovery of expansion energy and increasing the power transmitted by shaft 222 from expanders 220 and 221 to feed compressor 201, and reducing the power required from prime mover 209. While heaters 225 and 241 are means to provide heat to the expanders, intercoolers 203, 205 and 207 are means to remove heat from the feed compressor and serve to reduce the required power of the higher compressor stages. The intercoolers 203, 205, 207 are optional features.

If light reflux heater 249 operates at a sufficiently high temperature so that the exit temperature of the light reflux expansion stages is higher than the temperature at which feed gas is delivered to the feed manifolds by conduits 212, 214 and 216, the temperature of the second ends 35 of the adsorbers 24 may be higher than the temperature of their first ends 34. Hence, the adsorbers have a thermal gradient along the flow path, with higher temperature at their second end relative to the first end. This is an extension of the principle of thermally coupled pressure swing adsorption" (TCPSA), introduced by Keefer in U.S. Pat. No. 4,702,903. Absorber rotor 11 then acts as a thermal rotary regenerator, as in regenerative gas turbine engines having a compressor 201 and an expander 220. Heat provided to the PSA process by heater 225 assists powering the process according to a regenerative thermodynamic power cycle, similar to advanced regenerative gas turbine engines approximately realizing the Ericsson thermodynamic cycle with intercooling on the compression side and interstage heating on the expansion side. In the instance of PSA applied to oxygen separation from air, the total light reflux flow is much less than the feed flow because of the strong bulk adsorption of nitrogen. Accordingly the power recoverable from the expanders is much less than the power required by the compressor, but will still contribute significantly to enhanced efficiency of oxygen production.

Figure 8:
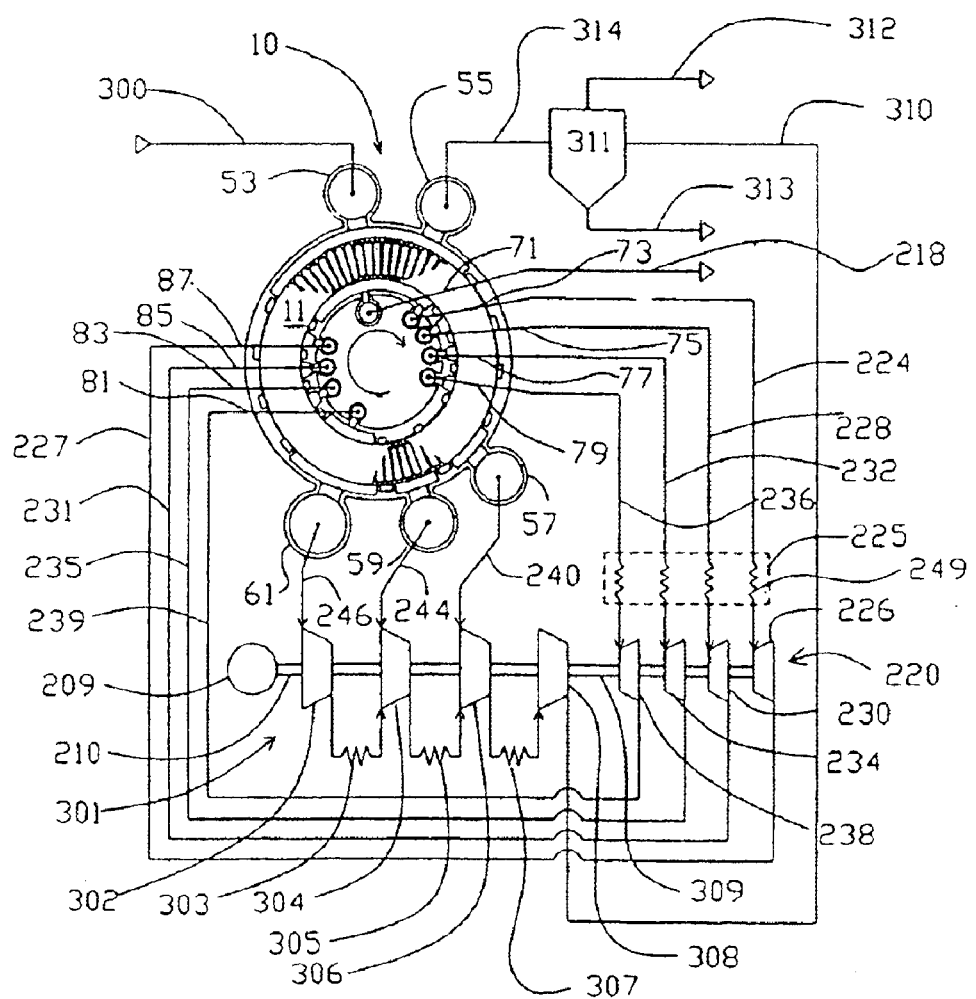
FIG. 8 shows a pressure swing adsorption apparatus for purifying hydrogen gas, suitable for use with the present invention, and depicting the rotary module shown in FIG. 1 and a compression machine coupled to the rotary module.

If high energy efficiency is not of highest importance, the light reflux expander stages and the countercurrent blowdown expander stages may be replaced by restrictor orifices or throttle valves for pressure letdown. The schematic of FIG. 7 shows a single shaft supporting the compressor stages, the countercurrent blowdown or exhaust expander stages, and the light reflux stages, as well as coupling the compressor to the prime mover. However, it should be understood that separate shafts and even separate prime movers may be used for the distinct compression and expansion stages within the scope of the present invention.
FIG. 8

FIG. 8 shows a vacuum-PSA system, also with heavy product reflux as could be used to achieve high recovery in hydrogen purification for fuel cell power plant. The raw hydrogen may be provided in certain stationary applications from chemical process or petroleum refinery offgases. However, in most fuel cell applications, the raw hydrogen gas feed will be provided by processing of a hydrocarbon or carbonaceous fuel, e.g. by steam reforming of natural gas or methanol, or by autothermal reforming or partial oxidation of liquid fuels. Such hydrogen feed gases typically contain 30% to 75% hydrogen. Using typical adsorbents such as zeolites, carbon dioxide, carbon monoxide, nitrogen, ammonia, and hydrogen sulfide or other trace impurities will be much more readily adsorbed than hydrogen, so the purified hydrogen will be the light product delivered at the higher working pressure which may be only slightly less than the feed supply pressure, while the impurities will be concentrated as the heavy product and will be exhausted from the PSA process as "PSA tail gas" at the lower working pressure. This tail gas will be used as fuel gas for the fuel processing reactions to generate hydrogen, or else for a combustion turbine to power PSA compression machinery for the fuel cell power plant.

The PSA system of FIG. 8 has infeed conduit 300 to introduce the feed gas at substantially the higher pressure to first feed manifold 53. In this example, all but the final pressurization steps are achieved with light reflux gas, with the final feed pressurization step being achieved through manifold 55.

The PSA system includes a multistage vacuum pump 301 driven by prime mover 209 through shaft 210, and optionally by light reflux expander 220 through shaft 309. The vacuum pump 301 includes a first stage 302 drawing heavy gas by conduit 246 from first product exhaust manifold 61, and compressing this gas through intercooler 303 to second stage 304. Vacuum pump second stage 304 draws heavy gas from second countercurrent blowdown manifold 59 through conduit 244, and delivers this gas by intercooler 305 to third stage 306 which also draws heavy gas from first countercurrent blowdown manifold 57 through conduit 240. The vacuum pump stage 306 compresses the heavy gas to a pressure sufficiently above ambient pressure for a portion of this gas (heavy product gas or PSA tail gas) to be delivered for use as fuel has in heavy product delivery conduit 307. The remaining heavy gas proceeds from vacuum pump 301 to heavy reflux compressor 308 which attains substantially the higher working pressure of the PSA cycle.

The compressed heavy gas is conveyed from compressor fourth stage 308 by conduit 310 to condensate separator 311. If desired (as for combustion in an expansion turbine as in the embodiment of FIG. 13), the entire heavy product stream could be compressed through compressor 308, so that the heavy product fuel gas may be delivered at the highest working pressure by alternative heavy product delivery conduit 312 which is externally maintained at substantially the higher pressure less frictional pressure drops. Condensed vapors (such as water) are removed through conduit 313 at substantially the same pressure as the heavy product in conduit 312. The remaining heavy gas flow, after removal of the first product, gas, flows by conduit 314 to the second feed manifold 55 as heavy reflux to the adsorbers following the feed step for each absorber. The heavy reflux gas is a second feed gas, of higher concentration in the more readily adsorbed component or fraction than the first feed gas.

Figure 9:
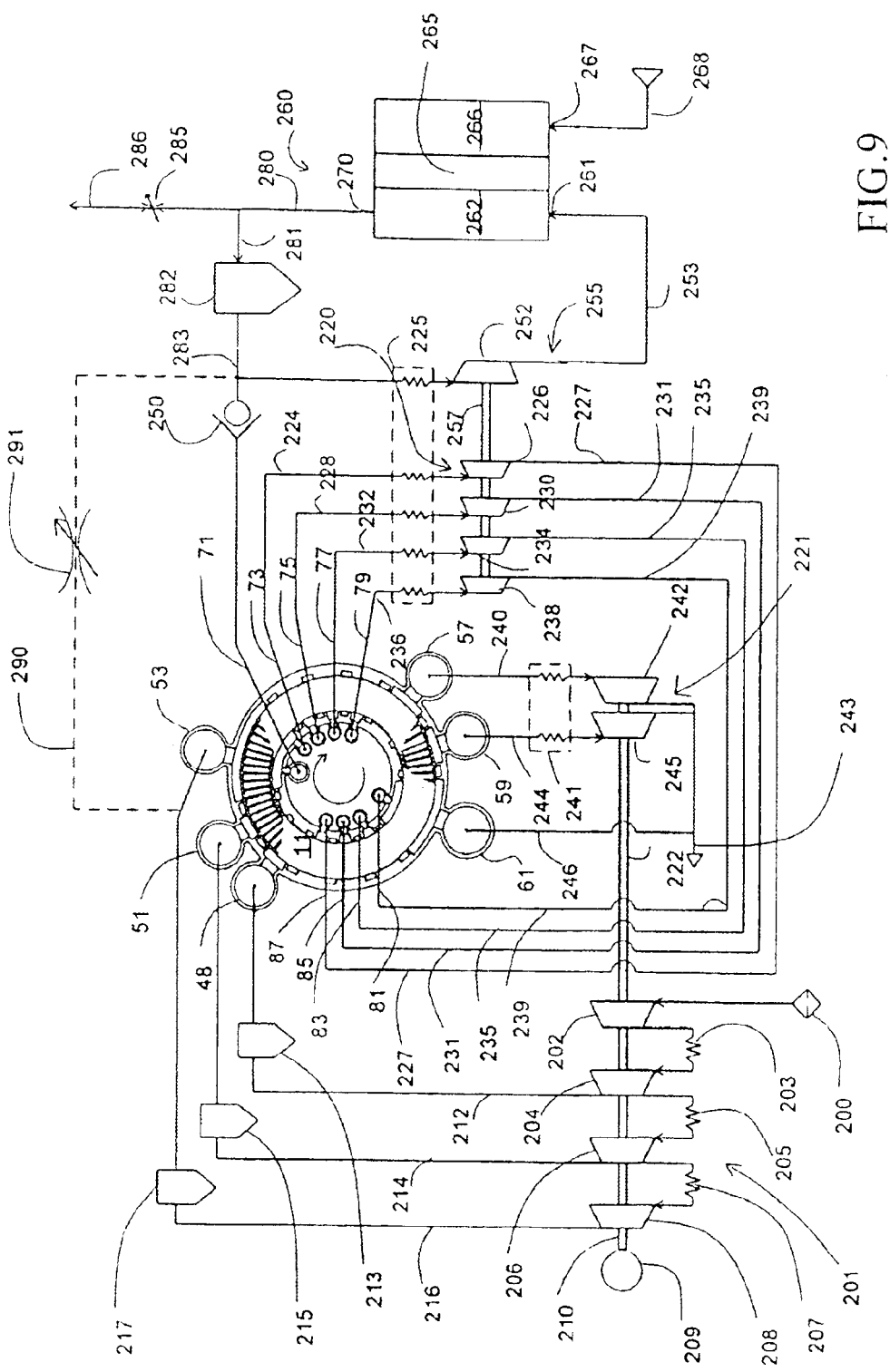
FIG. 9 shows an electrical current generating system, according to a first embodiment of the present invention, including an oxygen-separating PSA system for supplying enriched oxygen to the fuel cell cathode channel with energy recovery from light reflux expansion to boost the pressure of oxygen circulating in the fuel cell cathode loop.
Figure 10:
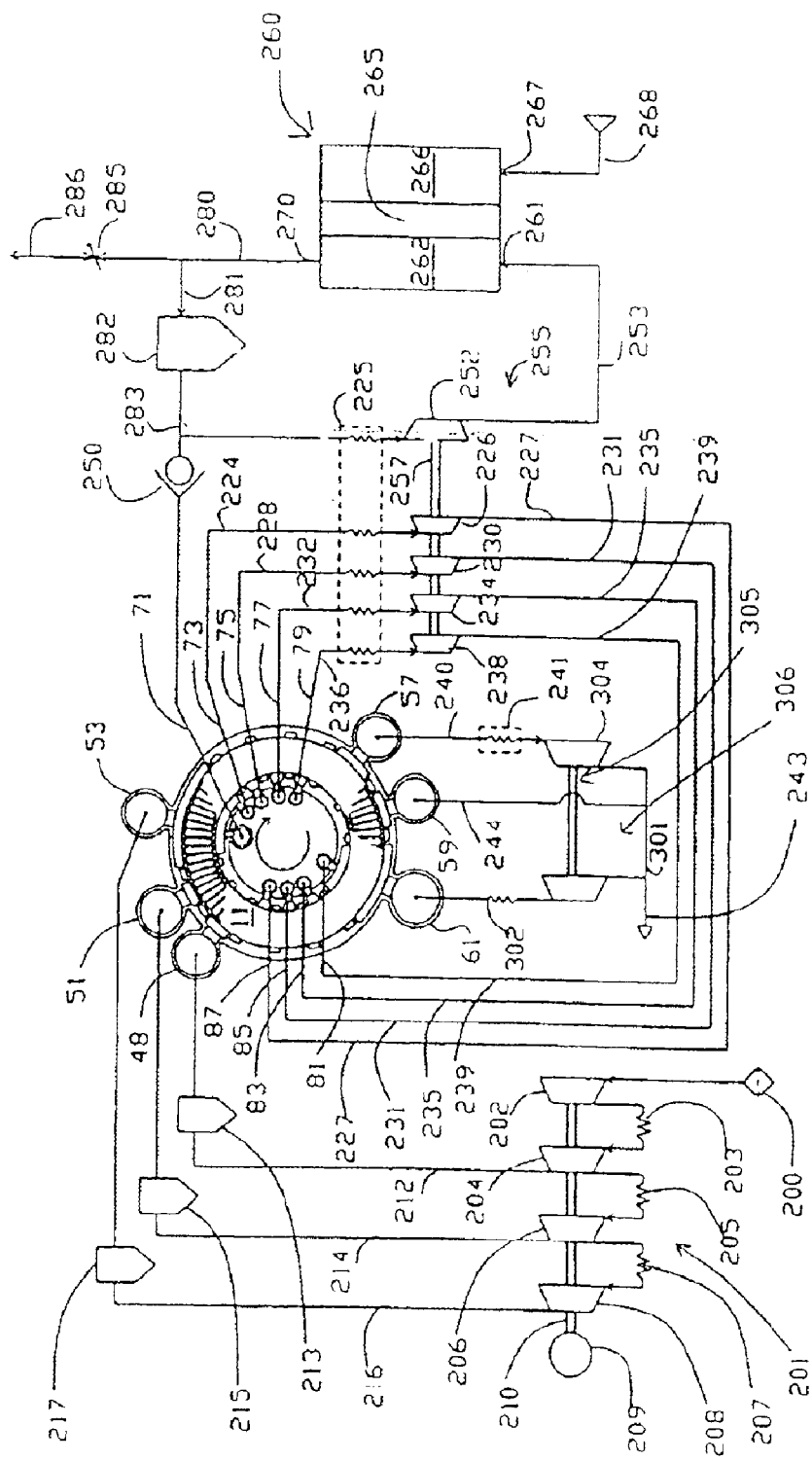
FIG. 10 shows a first variation of the electrical current generating system shown in FIG. 9, but with the PSA system including a countercurrent blowdown expander driving a free rotor exhaust vacuum pump for vacuum-PSA operation.

FIGS. 9 and 10

Turning now to FIGS. 9 and 10, fuel cell-based electrical current generating systems, according to a first embodiment of the present invention, are shown using a rotary PSA system similar to that shown in FIG. 7 as the basic building block. However, it should be understood that the invention is not limited to electrical current generating systems having rotary PSA modules. Rather other arrangements may be employed without departing from the scope of the invention.

In FIG. 9, the PSA system separates oxygen from air, using nitrogen-selective zeolite adsorbents, as previously described. The light product is concentrated oxygen, while the heavy product is nitrogen-enriched air usually vented as waste. The cycle lower pressure 152 is nominally atmospheric pressure, unless an optional vacuum pump is provided as in FIG. 8. Feed air is introduced through filter intake 200 to a feed compressor 201. The feed compressor includes compressor first stage 202, compressor second stage 204, compressor third stage 206, and compressor fourth stage 208. The feed compressor 201 as described may be a four stage axial compressor with motor 209 as prime mover coupled by shaft 210. The compressor stages may be in series as shown, or alternatively in parallel. Intercoolers between compressor stages are optional. The feed compressor first and second stages deliver feed gas at the first intermediate feed pressure 161 via conduit 212 and water condensate separator 213 to first feed pressurization manifold 48. Feed compressor third stage 206 delivers feed gas at the second intermediate feed pressure 163 via conduit 214 and water condensate separator 215 to second feed pressurization manifold 51. Feed compressor fourth stage 208 delivers feed gas at the higher pressure 151 via conduit 216 and water condensate separator 217 to feed manifold 53. Light product oxygen flow is delivered from light product manifold 71 by conduit 218, maintained at substantially the higher pressure less frictional pressure drops.

The apparatus of FIG. 9 includes energy recovery expanders, including light reflux expander 220 (here including four stages) and countercurrent blowdown expander 221 (here including two stages). Expander 221 is coupled to feed compressor 201 by shaft 222. The expander stages may be provided for example as radial inflow turbine stages, as full admission axial turbine stages with separate wheels, or as partial admission turbine stages combined in a single wheel. If high energy efficiency were not of highest importance, the light reflux expander stages and/or the countercurrent blowdown expander stages could be replaced by restrictor orifices or throttle valves for pressure letdown.

Light reflux gas from light reflux exit manifold 73 flows at the higher pressure via conduit 224 and heater 225 to first light reflux expander stage 226, and then flows at the third light reflux pressurization pressure 192 by conduit 227 to the first light reflux return manifold 87. Light reflux gas from second light reflux exit manifold 75 flows at the first concurrent blowdown pressure 171 via conduit 228 and heater 225 to the second expander stage 230, and then flows at the second light reflux pressurization pressure 191 by conduit 231 to the second light reflux return manifold 85. Light reflux gas from third light reflux exit manifold 77 flows at the second concurrent blowdown pressure 173 via conduit 232 and heater 225 to the third expander stage 234, and then flows at the first light reflux pressurization pressure 190 by conduit 235 to the third light reflux return manifold 83. Finally, light reflux gas from fourth light reflux exit manifold 79 flows at the third concurrent blowdown pressure 175 via conduit 236 and heater 225 to fourth light reflux expander stage 238, and then flows at substantially the lower pressure 152 by conduit 239 to the fourth light reflux return manifold 81.

Heavy countercurrent blowdown gas from first countercurrent blowdown manifold 57 flows at first countercurrent blowdown intermediate pressure 180 by conduit 240 to heater 241 and thence to first stage 242 of the countercurrent blowdown expander 221, and is discharged from the expander to exhaust manifold 243 at substantially the lower pressure 152.

Optional heaters 225 and 241 raise the temperature of gases entering expanders 220 and 221, thus augmenting the recovery of expansion energy and increasing the power transmitted by shaft 222 from expanders 220 and 221 to feed compressor 201, and reducing the power required from prime mover 209.

In the instance of PSA applied to oxygen separation from air, the total light reflux flow is much less than the feed flow because of the strong bulk adsorption of nitrogen. Accordingly the power recoverable from the expanders is much less than the power required by the compressor, but will still contribute significantly to enhanced efficiency of oxygen production. By operating the adsorbers at moderately elevated temperature (e.g. 40° to 60° C.) and using strongly nitrogen-selective adsorbents such as Ca-X, Li-X or lithium chabazite zeolites, the PSA oxygen generation system can operate with favorable performance and efficiency. Calcium or strontium exchanged chabazite may be used at higher temperatures, even in excess of 100° C., reflecting the extraordinary capacity of these adsorbents for nitrogen, their nitrogen uptake being too close to saturation at lower temperatures near ambient for satisfactory operation.

While higher temperature of the adsorbent will reduce nitrogen uptake and selectivity for each zeolite adsorbent, the isotherms will be more linear and humidity rejection will be easier. Working with adsorbents such as Ca-X and Li-X, recent conventional practice has been to operate ambient temperature PSA at subatmospheric lower pressures in so-called "vacuum swing adsorption" (VSA), so that the highly selective adsorbents operate well below saturation in nitrogen uptake, and have a large working capacity in a relatively linear isotherm range. At higher temperatures, saturation in nitrogen uptake is shifted to more elevated pressures, so that optimum PSA cycle higher and lower pressures are also shifted upward.

The enriched oxygen product gas is delivered by conduit 218, non-return valve 250, and conduit 251 to the inlet of oxygen product compressor 252 which boosts the pressure of product oxygen delivered by conduit 253. Compressor 252 may be a single stage centrifugal compressor, driven directly through shaft 254 by light reflux expander 220 or alternatively by a motor. Light reflux expander 220 may be the sole power source to compressor 252, in which case expander 220 and compressor 252 together constitute a free rotor turbo-booster 255. Since the working fluid in both expander 220 and compressor 252 is enriched oxygen, the free rotor turbo-booster embodiment has the important safety feature of not requiring a shaft seal to an external motor. Preferably, energy recovered from light reflux expansion is used to raise the delivery pressure of the light product, here oxygen.

The compressed enriched oxygen is delivered to a fuel cell 260, by conduit 253 to cathode inlet 261 of fuel cell cathode channel 262. Fuel cell 260 may be of the polymer electrolyte membrane (PEM), with the electrolyte 265 separating cathode channel 262 from anode channel 266. Hydrogen fuel is supplied to anode inlet 267 of anode channel 266 by hydrogen infeed conduit 268.

The enriched oxygen passes through cathode channel 262 to cathode exit 270, as a fraction of the oxygen reacts with hydrogen ions crossing the membrane to generate electrical power and reacting to form byproduct water. The cathode exit gas leaving the cathode channel in conduit 280 from cathode exit 270 (in this preferred embodiment) is still significantly enriched in oxygen relative to ambient air concentration of approximately 21%. A minor portion of this gas is purged as cathode purge gas from conduit 280 by purge valve 285 and purge exhaust 286, and the balance of the cathode exit gas is retained as cathode recycle gas. The cathode recycle gas is conveyed by conduit 281 to water condensate separator 282 where excess liquid water is removed from the cathode exit gas, which remains saturated in water vapor. The humid cathode recycle gas is then blended with incoming enriched oxygen form the PSA system by conduit 283 connecting to conduit 251.

Conduits 251, 253, 280, 281 and 283 thus form a cathode loop with cathode channel 262, compressor 252 and water condensate separator 282. Heat exchanger 225 may cool the oxygen-enriched gas to be compressed by compressor 252, by removing waste heat from the fuel cell cathode loop to heat light reflux gas before expansion in expander 220. Enough of the cathode exit gas is purged by purge valve 285 to avoid excessive build-up of argon and nitrogen impurities in the cathode loop. In a practicable example, the product oxygen concentration in conduit 218 may be 90% oxygen, with equal amounts of argon and nitrogen impurities. With a small purge flow, oxygen concentrations at cathode inlet 261 and at cathode exit 270 may be respectively 60% and 50%.

As discussed above, a PEM fuel cell operating with atmospheric air as oxidant may typically require air compression to at least 3 atmospheres in order to achieve a sufficiently high oxygen partial pressure over the cathode for competitive current density in the fuel cell stack. Oxygen concentration at the cathode inlet would be 21%, and at the cathode exit typically only about 10% oxygen. The present invention can achieve much higher average oxygen concentration over the fuel cell cathode channel, e.g. 55% compared to approximately 15%. Hence, the operating pressure may be reduced to about 1.5 atmospheres while still retaining a substantial enhancement of oxygen partial pressure over the cathode. With higher oxygen partial pressure over the cathode, fuel cell stack power density and efficiency can be enhanced, as is particularly crucial in automotive power plant applications. Mechanical compression power required by the apparatus of the present invention (using high performance adsorbents such as Li-X) will be less than that required for the air compressor of a PEM fuel cell system operating at 3 atmospheres air supply pressure, further enhancing overall power plant efficiency.

An important benefit in this example apparatus is that the oxygen enriched gas entering cathode inlet 261 is humidified by blending with the much larger stream of saturated cathode recycle gas. Another benefit is that energy recovery from the PSA unit can be applied to boost pressure and drive recycle circulation in the cathode loop, while fuel cell waste heat can be applied to heat exchangers 225 and 241 to enhance expansion energy recovery in the PSA unit. Yet another benefit is that suitable cathode channel circulation flow velocities to assure satisfactory water removal from PEM fuel cells are readily achieved.

While recycle of cathode gas has benefits as discussed above, it will be understood that the invention may also be practiced without any such recycle feature, so that the cathode gas from cathode exit 270 may alternatively be either discharged to atmosphere or else removed to another use such as assisting combustion within a fuel processor.

Another variation is to operate the oxygen PSA unit to deliver oxygen at a relatively high concentration (e.g. in the range of 60% to 95%, or more preferably 70% to 90% oxygen concentration), while bypassing a fraction of the compressed air feed from conduit 216 past the PSA module to blend directly with product oxygen in conduit 70, conduit 283 or conduit 253. In this approach, the blended bypass air and PSA oxygen product (plus any recycle cathode gas from cathode exit port 270) may have a mixed oxygen concentration in the range of e.g. 30% to 50% so that a substantial benefit of partial oxygen enrichment over the fuel cell cathode is provided, while the size and power consumption of the PSA unit is reduced.

Turning to FIG. 10, an oxygen-separating PSA-based fuel cell system is shown, similar to the fuel cell system in FIG. 9, but with a countercurrent blowdown expander driving a free rotor exhaust vacuum pump. Thus, in FIG. 9 dashed line 290 represents an optional feed air bypass conduit 290 with a flow control valve 291, communicating between compressed air feed conduit 216 and conduit 283 in the cathode recycle loop. In the embodiment of FIG. 10, shaft 222 coupling the countercurrent blowdown expander 221 to feed compressor 201 has been removed. Instead, vacuum pump 301 is used to depress the low pressure of the cycle below atmospheric pressure, drawing nitrogen-enriched waste gas from heavy product exhaust compartment 61 via conduit 246 and optional heater 302. Pump 301 is powered by countercurrent blowdown expander 304 expanding countercurrent blowdown gas from first countercurrent blowdown manifold 57 via conduit 240 and optional heater 241. Vacuum pump 301 and expander 304 are coupled by shaft 305, and together constitute a free rotor vacuum pump assembly 306. Such a free rotor vacuum pump offers attractive advantages of efficiency and capital cost. Alternatively, a motor could be coupled to an extension of shaft 305.

The countercurrent blowdown gas from second countercurrent blowdown manifold 59 exits that manifold at a pressure which is substantially atmospheric or slightly greater according to the amount of throttling restriction associated with conduit 244.

FIG. 11

Figure 11:
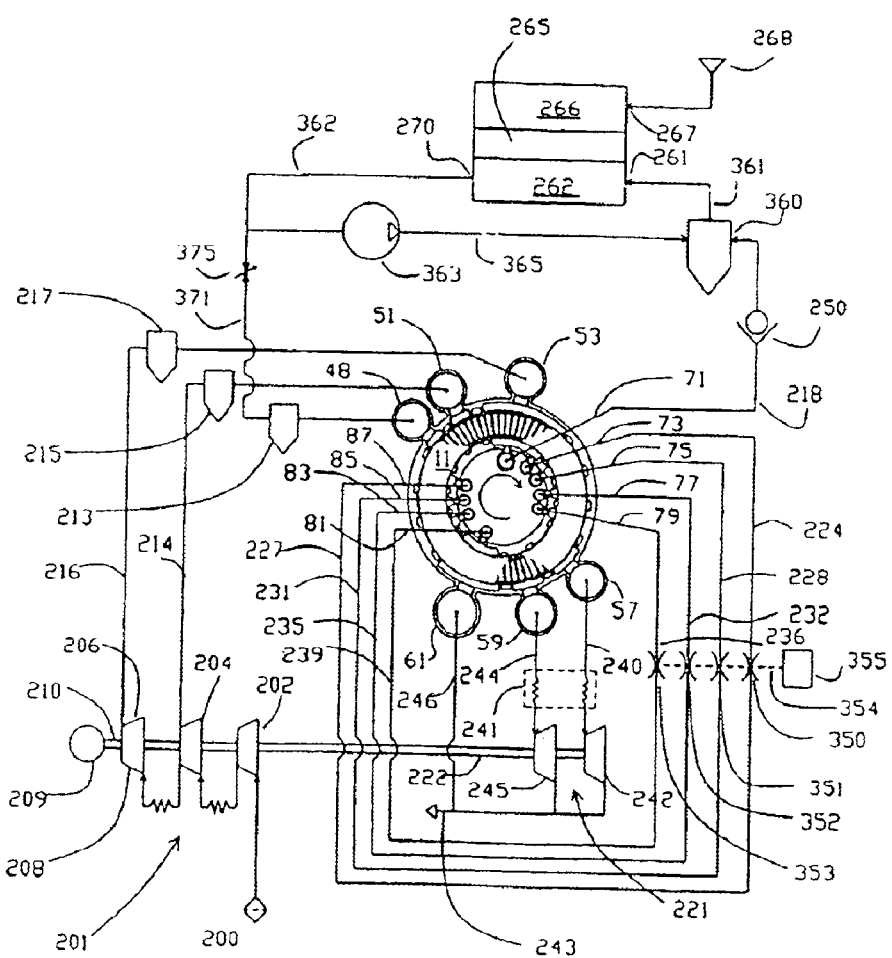
FIG. 11 shows a second variation of the electrical current generating system shown in FIG. 9, with a portion of the oxygen enriched gas discharged from the fuel cell cathode being used for a pressurization step for the PSA system.

FIG. 11 shows a fuel cell-based electrical current generating system, similar to the electrical current generating system of FIG. 9, but without light reflux energy recovery, and with a portion of oxygen enriched gas discharged from the fuel cell cathode being used for a pressurization step. The illustrative four stages of light reflux pressure letdown are achieved irreversibly over adjustable orifices 350, 351, 352 and 353, which respectively connect conduits 224 and 227, 228 and 231, 232 and 235, and 236 and 239. Orifices 350, 351, 352 and 353 are actuated through linkage 354 by actuator(s) 355. Adjustment of the orifices is desirable to enable turndown of the PSA apparatus to operation at reduced cycle frequency and reduced flow rates when the fuel cell power plant is operated at part load.

The fuel cell has a cathode recycle loop defined (in the loop flow direction) by water condensate separator 360, conduit 361 conveying enriched oxygen to cathode channel inlet 261, cathode channel 262, conduit 362 conveying cathode exhaust gas from cathode channel exit 270 to cathode recycle conduit 365 including cathode recycle blower 363 to pressurize the cathode recycle gas for admission to condensate separator 360. Separator 360 removes fuel cell water exhaust condensate from the cathode recycle loop, while also humidifying the dry concentrated oxygen admitted from the PSA system conduit from conduit 218.

A portion of the cathode exhaust is removed from the conduit 362 by conduit 371, branching from cathode recycle conduit 365. This portion of the cathode exhaust gas is recycled to the feed end of the PSA (or alternatively vacuum-PSA) apparatus, and is conveyed by conduit 371 to water condensate separator 373 and thence to first pressurization manifold 48 communicating to the first valve face 21. A throttle valve 373 may be provided in conduit 371 to provide a pressure letdown as required from the pressure at cathode exit 270 to first pressurization manifold 48.

Recycling a portion of the cathode exhaust gas to the PSA unit feed has several advantages, including (1) reducing the volume of feed gas to be compressed, (2) eliminating the requirement to purge any cathode exhaust gas from the cathode loop, and (3) recovering some waste energy from the fuel cell cathode loop by using this gas to help pressurize the fuel cell from the feed end. This oxygen rich gas must be admitted to the feed end of the PSA unit, because it is saturated with water vapor which would deactivate the adsorbent if admitted directly to the second valve face at the product end. By introducing it to the feed end of the beds after the low pressure step and before any direct pressurization with feed air, a favorable concentration profile is established since this gas is richer in oxygen than feed air, but also contains a greater load of impurities than the product oxygen-enriched gas.

Because argon is concentrated with oxygen by the PSA unit, argon will be concentrated both within the cathode loop and in the PSA enriched oxygen product in this embodiment. If no cathode purge is provided, argon can only exit the system through the exhaust of the PSA unit. Since the PSA unit typically achieves about 60% recovery of oxygen and argon when ordinary air is used as the only feed for pressurization to the first valve face, about 40% of argon admitted with feed gas may be exhausted in each cycle. The fractional elimination of recycle argon introduced with initial feed pressurization steps will be lower, since the main feed is introduced subsequently to push the recycle argon deeper into the absorbers. Hence, a small amount of purge from the cathode loop may be desirable. Cathode exhaust gas recycle to the PSA unit feed may also be blended directly with feed air introduced at the same or lower pressure as the cathode channel exit 270.

FIG. 12

Figure 12:
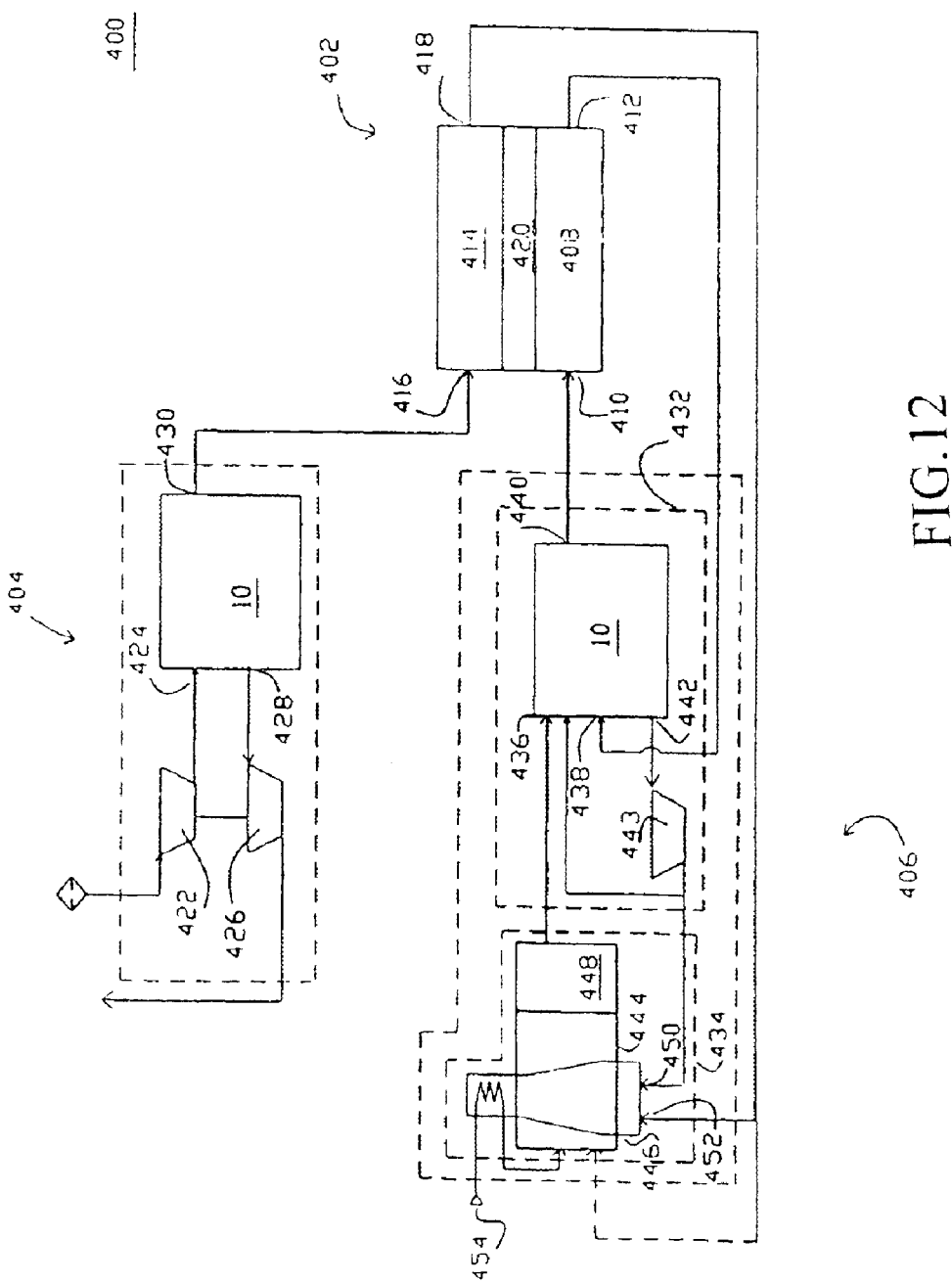
FIG. 12 shows an electrical current generating system, according to a second embodiment of the present invention, including an oxygen-separating PSA system for supplying enriched oxygen to the fuel cell cathode channel, and a hydrogen-separating PSA system for supplying enriched hydrogen to the fuel cell anode channel, with the hydrogen-separating PSA system receiving feed gas from a stream reformer.

FIG. 12 shows a fuel-cell based electrical current generating system 400, according to a second embodiment of the present invention, comprising a fuel cell 402, an oxygen-generating PSA system 404, and a hydrogen gas production system 406. The fuel cell comprises an anode channel 408 including an anode gas inlet 410 and an anode gas outlet 412, a cathode channel 414 including a cathode gas inlet 416 and a cathode gas outlet 418, and a PEM 420 in communication with the anode channel 408 and the cathode channel 414 for facilitating ion exchange between the anode channel 408 and the cathode channel 414.

The oxygen-PSA system 404 extracts oxygen gas from feed air, and comprises a rotary module 10, and a compressor 422 for delivering pressurized feed air to the feed compartments 424 of the rotary module 10. Preferably, the oxygen-PSA system 404 includes a vacuum pump 426 (or alternatively countercurrent blowdown expander) coupled to the compressor 422 for withdrawing nitrogen-enriched gas as heavy product gas from the blowdown compartments 428 of the rotary module 10. The oxygen-PSA system 404 also includes a light product gas function compartment 430 coupled to the cathode gas inlet 416 for delivering oxygen-enriched gas to the cathode channel 414. Cathode recycle may be provided as in the embodiments of FIGS. 9–11.

The hydrogen gas production system 406 comprises a hydrogen-generating PSA system 432, and a fuel processor reactor 434 coupled to the hydrogen-PSA system 432 for supplying a first hydrogen gas feed to the hydrogen-PSA system 432. The hydrogen-PSA system 432 comprises a rotary module 10 including a first feed gas compartment 436 for receiving a first hydrogen gas feed from the reactor 434, a pressurization compartment 438 for receiving a hydrogen gas feed from the anode gas outlet 412, a light product compartment 440 for delivering hydrogen gas to the anode gas inlet 410, and a blowdown compartment 441 for delivering tail gas as heavy product gas to the reactor 434. Preferably the hydrogen-PSA system 432 includes a vacuum pump 442 (or alternately a countercurrent blowdown expander) provided between the blowdown compartment 441 and the reactor 434 for extracting the tail gas from the blowdown compartment 441.

According to the purity level of the hydrogen gas recycled from the anode gas exit 412, pressurization compartment 438 may cooperate with either the first or second valve of the rotary module, the latter being preferred if the purity of this stream is relatively high. The hydrogen-PSA system 432 may also include a heavy reflux compressor 443 delivering heavy reflux gas to a second feed gas compartment 444 to improve the fractional recovery of hydrogen gas. The calorific fuel gas requirements of the hydrogen gas production system 406 will determine the correct recovery of hydrogen gas.

The reactor 434 comprises a steam reformer 445, including a burner 446 and catalyst tubes (not shown), and a water gas shift reactor 448. The burner 446 includes a first burner inlet 450 for receiving the tail gas from the blowdown compartment 442, and a second burner inlet 452 for receiving air or humid oxygen-enriched gas from the cathode channel 414. The steam reformer 444 is supplied through a fuel inlet 454 with a hydrocarbon fuel, such as methane gas, plus water at a feed pressure which is the working pressure of the fuel cell plus an allowance for pressure drops through the system 406. The fuel is preheated and steam is generated by heat exchanger 455, recovering heat from the flue gas of burner 446. The methane fuel gas and steam mixture is them passed through the catalyst tubes, while the tail gas and the oxygen-enriched gas are burned in the burner 446 to elevate the temperature of the methane fuel gas mixture to the temperature necessary (typically 800° C.) for conducting endothermic steam reforming reactions of the methane fuel gas mixture:

$$CH_4 + H_2O \rightarrow CO + 3H_2$$

$$CH_4 + 2H_2O \rightarrow CO_2 + 4H_2$$

The resulting syngas (approximately 70% $H_2$, with equal amounts of CO and $CO_2$ as major impurities, and unreacted $CH_4$ and $N_2$ as minor impurities) is cooled to about 250° C., and then passed to the water gas shift reactor 448 for reacting most of the CO with steam to produce more $H_2$ and $CO_2$:

$$CO + H_2O \rightarrow CO_2 + H_2$$

The resulting gas reactants are then conveyed to the first feed compartment 436 of the hydrogen-PSA system 432 for hydrogen purification, with the heavy product tail gas being returned to the steam reformer 434 form the blowdown compartment 442 for combustion in the burner 446.

In one variation, the reactor 434 comprises a partial oxidation reactor, and instead of the methane gas mixture being steam reformed, the methane gas mixture is reacted in the partial oxidation reactor with a portion of the humid oxygen-enriched gas received from the cathode channel 414, through an optional conduit 456, for partial oxidation of the methane gas:

$$CH_4 + \tfrac{1}{2}O_2 \rightarrow CO + 2H_2$$

The resulting syngas is again cooled to about 250° C., and then passed to the water gas shift reactor 448 for reacting most of the CO with steam to produce more $H_2$ and $CO_2$:

$$CO + H_2O \rightarrow CO_2 + H_2$$

The resulting gas reactants are then conveyed to the first feed compartment 436 of the hydrogen-PSA system 432 for hydrogen purification, with the heavy product tail gas being purged from the hydrogen-PSA system 432.

In another variation, the reactor 434 comprises as autothermal reformer and a water gas shift reactor 448, and instead of the methane gas mixture being endothermically steam reformed or exothermically partially oxidized, the methane gas mixture is reacted in the autothermal reformer by a thermally balanced combination of those reactions, followed by reaction in the water gas shift reactor 448. Since the hydrogen-PSA heavy product tail gas will always have some fuel value even in the limit of very high heavy reflux, a burner 446 would be provided for efficiently preheating air and or fuel feeds to any autothermal reactor. Unless the fuel processing reactions include an endothermic reforming component as an energy-efficient sink for tail gas fuel combustion, another economic use (as in embodiment of FIG. 13) should be provided if the net fuel processing reactions are highly endothermic, as in the case of simple partial oxidation.

Oxygen enrichment autothermal or partial oxidation fuel processor advantageously reduces the heating load of reactants entering the reaction chamber, and also reduces the cooling load of hydrogen-rich product gases delivered to the hydrogen PSA unit and the fuel cell anode, owing to the depletion of nitrogen from those gas streams. A further advantage of the present invention is the ability of the hydrogen PSA unit to remove ammonia in addition to carbon monoxide and hydrogen sulfide, which contaminants are all extremely detrimental to PEM fuel cell performance and life expectancy. Ammonia may be formed in fuel processors where hydrocarbons are catalytically reformed to hydrogen in the presence of any atmospheric nitrogen. The oxygen PSA reduces this problem by front-end removal of nitrogen, while the hydrogen PSA removes any residual traces of ammonia.

FIG. 13

Figure 13:
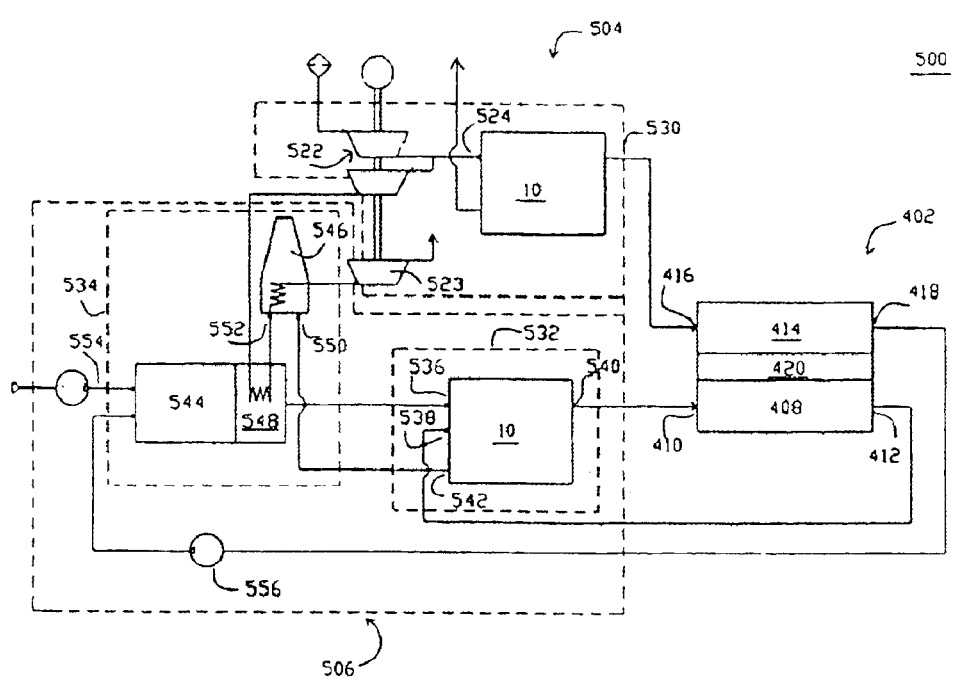
FIG. 13 shows an electrical current generating system, according to a variation of the electrical current generating system shown in FIG. 12, but with the hydrogen-separating PSA system receiving feed gas from an autothermal reformer.

It would be apparent that a deficiency of the electrical current generating system 400 relates to the necessity of driving the compressor 422 and the vacuum pumps 426, 444 with a portion of the electrical power generated by the fuel cell. FIG. 13 shows a fuel cell based electrical current generating system 500, which addresses this deficiency.

The electrical current generating system 500 is substantially similar to the electrical current generating system 400, comprising the fuel cell 402, an oxygen-generating PSA system 504, and a hydrogen gas production system 506. The oxygen-PSA system 504 extracts oxygen gas from feed air, and comprises a rotary module 10, a compressor 522 for delivering pressurized feed air to the feed compartments 524 of the rotary module 10, a combustion expander 523 coupled to the compressor 522, a starter motor (not shown) coupled to the compressor 522, and a light product gas function compartment 530 coupled to the cathode gas inlet 416 for delivering oxygen-enriched gas to the cathode channel 414. The oxygen-PSA system 504 may also have a countercurrent blowdown or heavy product exhaust compartment 531 cooperating with a vacuum pump and/or expander, as illustrated in previous embodiments.

The hydrogen gas production system 506 comprises a hydrogen-generating PSA system 532, and a reactor 534 coupled to the hydrogen-PSA system for supplying a first hydrogen gas feed to the hydrogen-PSA system 532. The hydrogen-PSA system 532 comprises a rotary module 10 including a first feed gas compartment 536 for receiving a first hydrogen gas feed from the steam reformer 534, a pressurization compartment 538 (communicating with either the first or second valve) for receiving a second hydrogen gas feed from the anode gas outlet 412, a light product compartment 540 for delivering hydrogen gas to the anode gas inlet 410, and a blowdown compartment 541 for delivering tail gas as heavy product fuel gas to the reactor 534. As in previous embodiments, the blowdown compartment 541 may cooperate with an exhaust vacuum pump and/or expander (not shown) for extracting the tail gas from the blowdown compartment 541.

The reactor 534 comprises an autothermal reformer 544, a burner 546, and a water gas shift reactor 548. The burner 546 includes heater tubes 549, a first burner inlet 550 for receiving the tail gas from the blowdown compartment 542, and a second burner inlet 552 for receiving compressed air from the compressor 522 second stage. As will be apparent from FIG. 13, the compressor 522 second stage compresses a portion of the feed air which is not delivered to the oxygen-generating PSA system 504.

The expander 523 and the compressor 522 together comprise a gas turbine, and expands combustion product gas emanating from the burner 546 so as to increase the pressure of feed air to the feed compartments 524. As will be appreciated, the thermal energy of combustion of the hydrogen-PSA tail gas is used to drive the fuel cell accessory gas purification and compression machinery. As shown in FIG. 13, additional feed gas compression energy may be obtained from the exothermic heat of reaction of the water gas shift reactor 548 through preheat exchangers 555.

The autothermal reformer 544 is supplied through a fuel inlet 554 with a hydrocarbon fuel gas, such as methane gas and, in the example shown, is reacted with oxygen-enriched gas received under pressure from the cathode channel 414 through booster blower 556. Cathode recycle may not be justified, or at least may be reduced, if the oxygen-enriched gas delivered from the cathode exit can be used advantageously for fuel processing (to reduce nitrogen load and enhance combustion). The resultant syngas is then cooled, and then passed to the water gas shift reactor 548 for reacting most of the CO with steam to produce more $H_2$ and $CO_2$. The resulting gas reactants are then conveyed to the first feed compartment 536 of the hydrogen-PSA system 532 for hydrogen purification.

In some embodiments, at least a portion of the cathode exhaust gas (which is still enriched in oxygen relative to ambient air, and carries fuel cell exhaust water and fuel cell waste heat) is returned to the inlet of an autothermal or partial oxidation fuel processor (or reformer) for reacting a hydrocarbon fuel with oxygen and steam in order to generate raw hydrogen or syngas. The oxygen reacts autothermally with a portion of the fuel to produce carbon monoxide and heat which furthers reaction of remaining fuel with steam to generate hydrogen. Excess steam helps prevent any coking in the reformer or fuel processor, and subsequently reacts at lower temperature with the carbon monoxide in a water gas shift reactor to generate more hydrogen mixed with waste carbon dioxide. Residual carbon monoxide, the carbon dioxide and any other impurities can then be removed by a hydrogen PSA unit according to the invention.

Delivery of still enriched oxygen gas from the fuel cell cathode to the inlet of the fuel processor (1) reduces the inert load of nitrogen entrained with atmospheric air as oxidant, (2) enhances circulation velocities within the fuel cell cathode channel for effective water removal, (3) directly recovers exhaust water from the cathode for the fuel processor in direct accordance with water demand for fuel processing, (4) delivers that water largely in vapor form to avoid costly condensation and revaporization steps, (5) delivers some fuel cell waste heat usefully to the fuel processor inlet, and (3) enhances overall system efficiency through desirable thermal integration.

FIG. 14

Embodiment 600 illustrates further aspects of the invention. For alkaline fuel cells, the crucial problem is removal of $CO_2$ from both feed oxidant and hydrogen streams. The oxygen-PSA and hydrogen-PSA systems of this invention as described above will remove $CO_2$ very effectively, since $CO_2$ is much more strongly adsorbed than other permanent gas impurities. Oxygen enrichment is beneficial for all types of fuel cells in increasing voltage efficiency, although not usually justified except at high current densities. Alkaline fuel cells can use an under-sized oxygen-PSA for very effective carbon dioxide removal along with modest oxygen enrichment, or may use the same PSA device with an adsorbent lacking nitrogen/oxygen selectivity (e.g. activated carbon, or high silica zeolites) for carbon dioxide clean-up without oxygen enrichment. The rotary PSA module and compression machinery of this invention for entirely suitable for this role.

Alkaline fuel cells operating on ambient air feed typically operate near atmospheric pressure, at about 70° C. Under such conditions, the water vapor saturated cathode exhaust stream of nitrogen-enriched air serves to remove fuel cell product water while maintaining electrolyte water balance. Operation of alkaline fuel cells at higher temperature may be desirable for high efficiency with less costly electrocatalyst materials, or else for thermal integration to a methanol reformer using fuel cell waste heat to vaporize reactants and even drive the endothermic reaction. But with increasing stack exhaust temperatures, operation with ambient air composition may rapidly become impracticable. At higher temperatures, the nitrogen rich cathode exhaust simply carries too much water vapor out of the system, unless the total pressure is uneconomically raised or else a condenser for water recovery is included.

With oxygen enrichment, the volume of the cathode exhaust can be adjusted to achieve water balance for any alkaline fuel cell. Reasonable low stack working pressures become practicable, e.g. about 3 atmospheres for a cathode exit temperature of 120° C. If oxygen enrichment is carried out to the full capability of oxygen-PSA, e.g. approaching 95% oxygen purity, the cathode exhaust stream becomes dry steam with a modest concentration of permanent gases. This steam product may be useful for diverse applications, including fuel processing of hydrocarbon feedstocks to generate hydrogen.

Embodiment 600 shows an oxygen-PSA (also performing $CO_2$ removal) as shown in FIG. 12. The hydrogen side of the system is simplified in this example to show only the anode gas inlet of pure hydrogen. Oxygen at more than 90% purity is supplied to the cathode gas inlet 416, while concentrated water vapor is delivered from cathode gas exit 418 and conveyed directly to steam expander 610. Expander 610 discharges to vacuum condenser 612, from which liquid condensate is removed by pump 614, while the permanent gas overheads are withdrawn through conduit by vacuum pump 426 of the oxygen-PSA. Expander 610 may assist motor 616 to drive the compression machinery of the oxygen-PSA, thus improving overall efficiency of the fuel power plant by approximately 2 to 3%.

Figure 14:
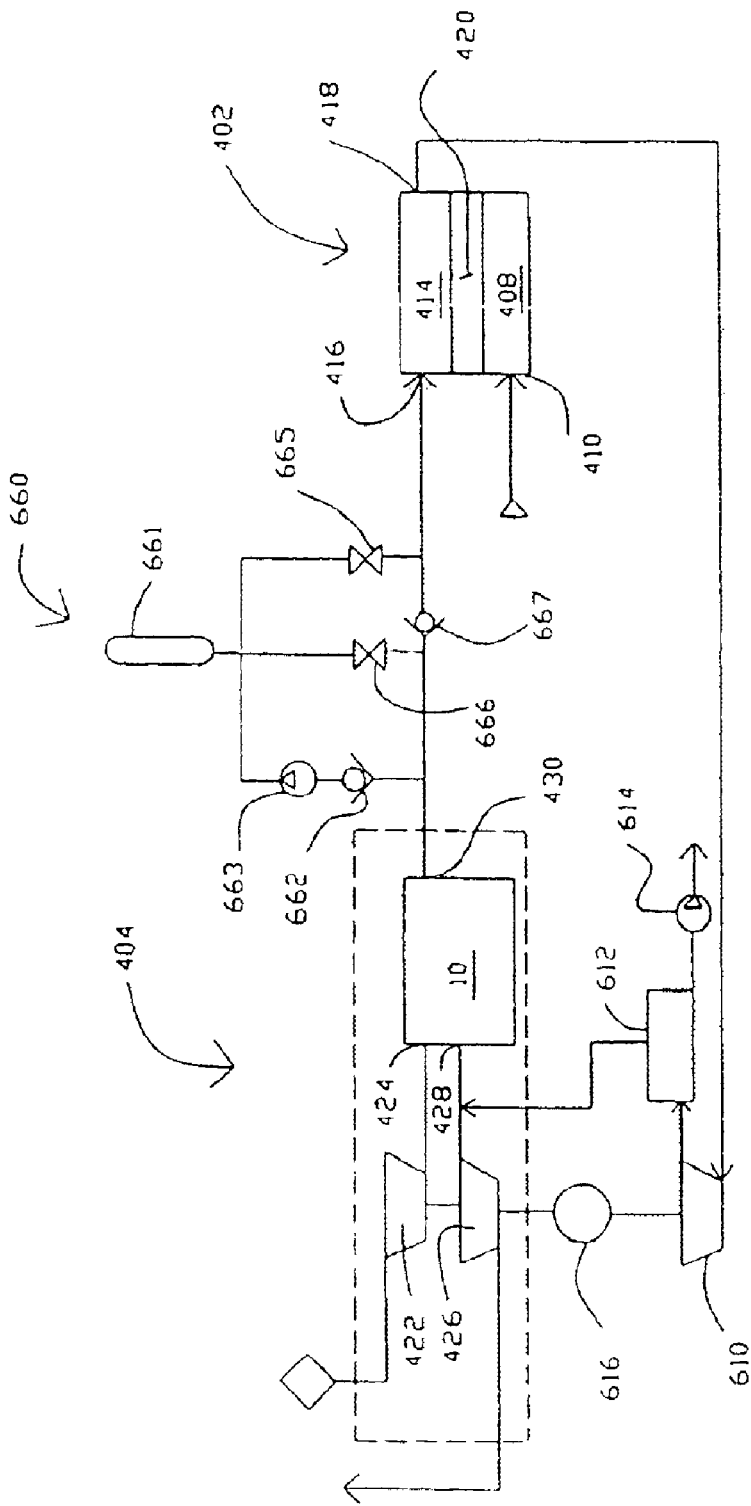
FIG. 14 shows an electrical current generating system with carbon dioxide removal and oxygen enrichment for an alkaline fuel cell, and with an oxygen accumulator.

A final aspect of the invention (for any type of fuel cell) is the optional provision of light product gas accumulators for the PSA units, and particularly for the oxygen-PSA as illustrated in FIG. 14. Oxygen product accumulator 660 includes an oxygen storage vessel 661 charged from the light product compartment 430 through non-return valve 662, at substantially the upper pressure of the PSA process or optionally at an elevated pressure generated by a small accumulator charging compressor 663. A peaking oxygen delivery valve 665 and a backflush valve 666 are provided on either side of non-return valve 667 so as to enable oxygen delivery from the storage vessel respectively forward to the fuel cell cathode inlet or backward to the oxygen-PSA unit.

The oxygen storage vessel is charged during normal operation, particularly during intervals of stand-by or idling when the oxygen-PSA attains highest oxygen purity. The optional charging compressor may be operated when the plant is idling, or (in vehicle applications) as an energy load application of regenerative braking. The peaking oxygen delivery valve 665 is opened during intervals of peak power demand, so as to increase supply of concentrated oxygen to the cathode when most needed. If the oxygen accumulator is large enough, the oxygen-PSA compressor 422 and vacuum pump 426 could be idled during brief intervals of peak power demand, so as to release the power normally consumed by internal accessories to meet external demand. Then, the size of the fuel cell stack (in a power plant required to meet occasional specified peak power levels) can be reduced for important cost savings.

When the fuel cell power plant is shut down, the oxygen-PSA compressor 422 is stopped first to drop the internal pressure for an initial blowdown of all absorbers. Then, backflush valve 666 is opened to release a purging flow of oxygen to displace adsorbed nitrogen and some adsorbed water vapor from the absorbers over a short time interval. The absorbers are then left precharged with dry oxygen at atmospheric pressure, thus enabling fast response of the oxygen-PSA for the next plant start-up.

FIGS. 15–21

Figure 15:
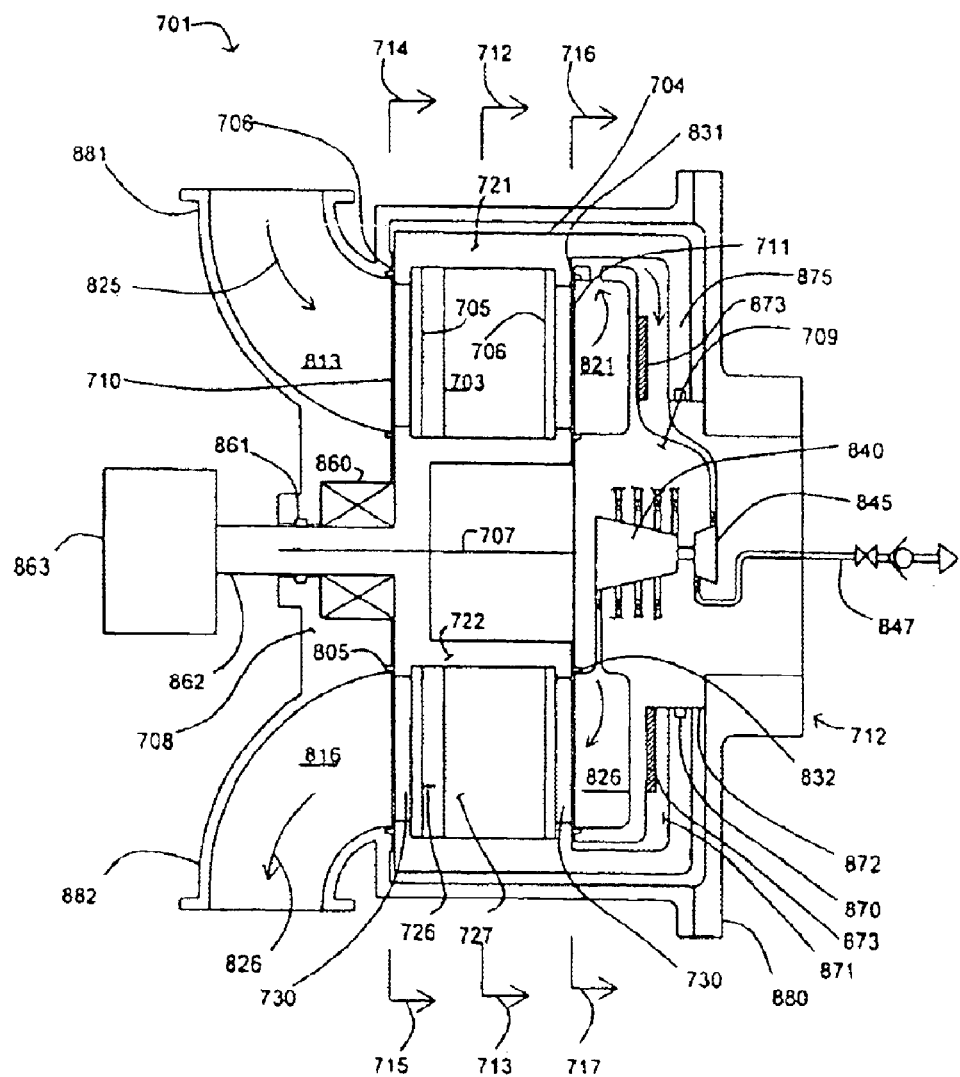
FIG. 15 shows an axial section of a rotary PSA module with rotating adsorbers and stationary distributor valves.

FIG. 15 shows a rotary PSA module 701 configured for axial flow and particularly suitable for smaller scale oxygen generation and hydrogen purification. Module 701 includes a number "N" of adsorbers 703 in absorber housing body 704. Each absorber has a first end 705 and a second end 706, with a flow path therebetween contacting a nitrogen-selective adsorbent. The adsorbers are deployed in an axisymmetric array about axis 707 of the absorber housing body. The housing body 704 is in relative rotary motion about axis 707 with first and second functional bodies 708 and 709, being engaged across a first valve face 710 with the first functional body 708 to which feed air is supplied and from which nitrogen-enriched air is withdrawn as the heavy product, and across a second valve face 711 with the second functional body 709 from which oxygen-enriched air is withdrawn as the light product.

In preferred embodiments as particularly depicted in FIGS. 15–21, the adsorber housing 704 rotates and shall henceforth be referred to as the adsorber rotor 704, while the first and second functional bodies are stationary and together constitute a stator assembly 721 of the module. The first functional body shall henceforth be referred to as the first valve stator 708, and the second functional body shall henceforth be referred to as the second valve stator 709.

In the embodiment shown in FIGS. 15–21, the flow path through the adsorbers is parallel to axis 707, so that the flow direction is axial, while the first and second valve faces are shown as flat annular discs normal to axis 707. However, more generally the flow direction in the adsorbers may be axial or radial, and the first and second valve faces may be any figure of revolution centred on axis 707. The steps of the process and the functional compartments to be defined will be in the same angular relationship regardless of a radial or axial flow direction in the adsorbers.

FIGS. 15–21 are cross-sections of module 701 in the planes defined by arrows 712–713, 714–715, and 716–717. Arrow 720 in each section shows the direction of rotation of the rotor 704.

Figure 16:
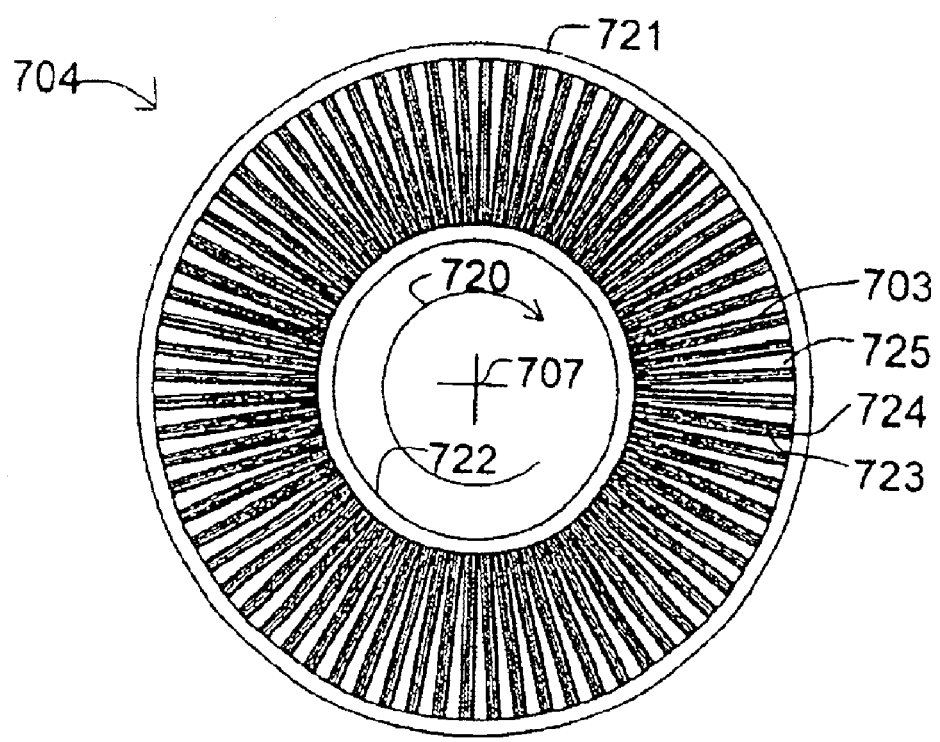
FIG. 16 shows a transverse section of the module of FIG. 15.

FIG. 16 shows section 712–713 across FIG. 15, which crosses the absorber rotor. Here, "N"=72. The adsorbers 703 are mounted between outer wall 721 and inner wall 722 of absorber rotor 704. Each absorber comprises a rectangular flat pack 703 of adsorbent sheets 723, with spacers 724 between the sheets to define flow channels here in the axial direction. Separators 725 are provided between the adsorbers to fill void space and prevent leakage between the adsorbers. Other preferred configurations for the absorber module may be provided by forming the adsorbent sheets and intervening spacers in trapezoidal packs or spiral rolls constituting each absorber.

Alternatively the entire absorber rotor may be formed as a spiral roll of one adsorbent sheet or a plurality of adsorbent sheets, the spiral roll formed concentric with the axis 707 and with spacers between adjacent layers of the spirally rolled adsorbent sheet(s), and with at least some of the spacers at narrow angular intervals extending along the entire length between the first and second ends as barriers to transverse flow, so as to partition the spiral roll into many channels, each of which serves as a distinct absorber. The first and second ends of the spiral roll would directly coincide with the first and second valve faces respectively.

The adsorbent sheets comprise a reinforcement material, in preferred embodiments glass fibre, metal foil or wire mesh, to which the adsorbent material is attached with a suitable binder. For air separation to produce enriched oxygen, typical adsorbents are X, A or chabazite type zeolites, typically exchanged with lithium, calcium, strontium, magnesium and/or other cations, and with optimized silicon/aluminium ratios as well known in the art. The zeolite crystals are bound with silica, clay and other binders, or self-bound, within the adsorbent sheet matrix.

Satisfactory adsorbent sheets have been made by coating a slurry of zeolite crystals with binder constituents onto the reinforcement material, with successful examples including nonwoven fibreglass scrims, woven metal fabrics, and expanded aluminium foils. Spacers are provided by printing or embossing the adsorbent sheet with a raised pattern, or by placing a fabricated spacer between adjacent pairs of adsorbent sheets. Alternative satisfactory spacers have been provided as woven metal screens, non-woven fibreglass scrims, and metal foils with etched flow channels in a photolithographic pattern.

Typical experimental sheet thicknesses have been 150 microns, with spacer heights in the range of 100 to 150 microns, and absorber flow channel length approximately 20 cm. Using X type zeolites, excellent performance has been achieved in oxygen separation from air at PSA cycle frequencies in the range of 30 to 150 cycles per minute.

Figure 17:
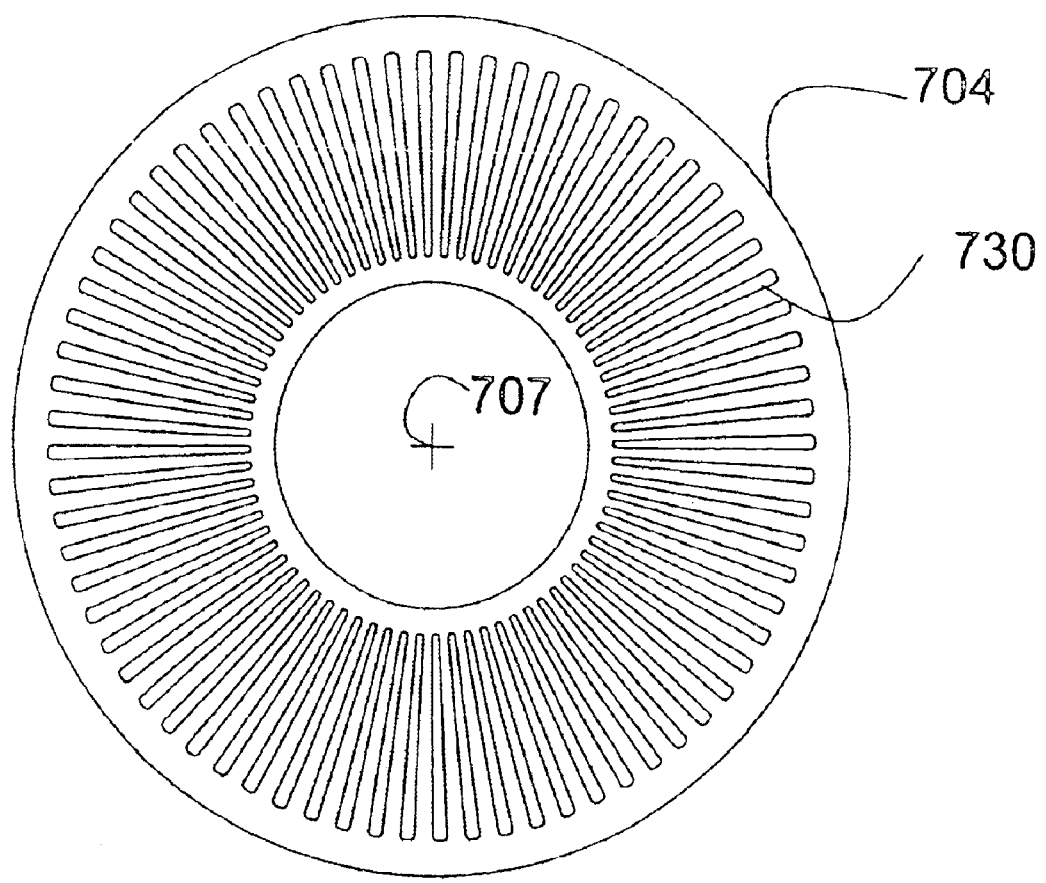
FIG. 17 shows a transverse section of the module of FIG. 15.

FIG. 17 shows the porting of rotor 704 in the first and second valve faces respectively in the planes defined by arrows 714–715, and 716–717. An absorber port 730 provides fluid communication directly from the first or second end of each absorber to respectively the first or second valve face.

Figure 18:
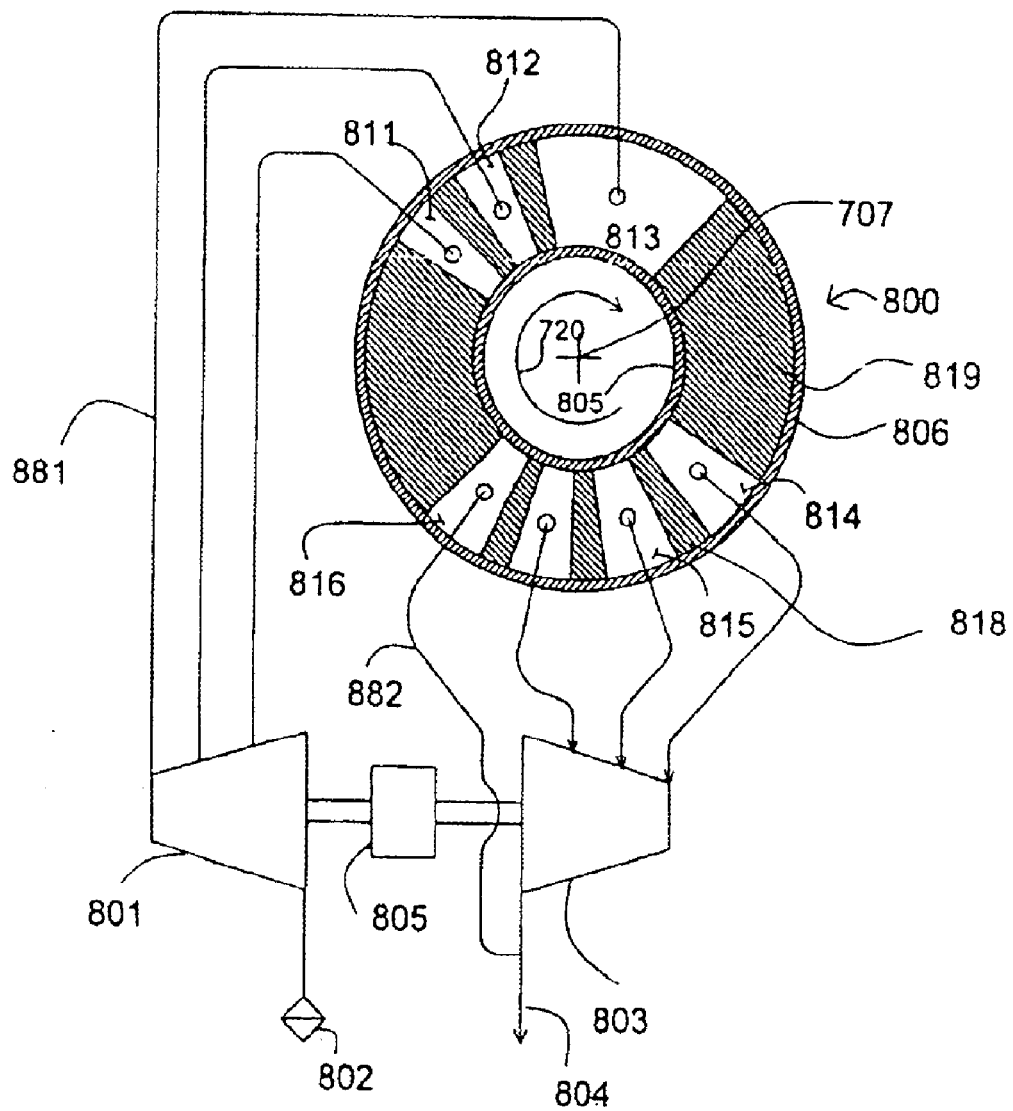
FIG. 18 shows a transverse section of the module of FIG. 15.

FIG. 18 shows the first stator valve face 800 of the first stator 708 in the first valve face 710, in the plane defined by arrows 714–715. Fluid connections are shown to a feed compressor 801 inducting feed air from inlet filter 802, and to an exhauster 803 delivering nitrogen-enriched second product to a second product delivery conduit 804. Compressor 801 and exhauster 803 are shown coupled to a drive motor 805.

Arrow 720 indicates the direction of rotation by the absorber rotor. In the annular valve face between circumferential seals 805 and 806, the open area of first stator valve face 800 ported to the feed and exhaust compartments is indicated by clear angular segments 811–816 corresponding to the first functional ports communicating directly to functional compartments identified by the same reference numerals 811–816. The substantially closed area of valve face 800 between functional compartments is indicated by hatched sectors 818 and 819 which are slippers with zero clearance, or preferably a narrow clearance to reduce friction and wear without excessive leakage. Typical closed sector 818 provides a transition for an absorber, between being open to compartment 814 and open to compartment 815. Gradual opening is provided by a tapering clearance channel between the slipper and the sealing face, so as to achieve gentle pressure equalization of an absorber being opened to a new compartment. Much wider closed sectors (e.g. 819) are provided to substantially close flow to or from one end of the adsorbers when pressurization or blowdown is being performed from the other end.

The feed compressor provides feed air to feed pressurization compartments 811 and 812, and to feed production compartment 813. Compartments 811 and 812 have successively increasing working pressures, while compartment 813 is at the higher working pressure of the PSA cycle. Compressor 801 may thus be a multistage or split stream compressor system delivering the appropriate volume of feed flow to each compartment so as to achieve the pressurization of adsorbers through the intermediate pressure levels of compartments 811 and 812, and then the final pressurization and production through compartment 813. A split stream compressor system may be provided in series as a multistage compressor with interstage delivery ports; or as a plurality of compressors or compression cylinders in parallel, each delivering feed air to the working pressure of a compartment 811 to 813. Alternatively, compressor 801 may deliver all the feed air to the higher pressure, with throttling of some of that air to supply feed pressurization compartments 811 and 812 at their respective intermediate pressures.

Similar, exhauster 803 exhausts nitrogen-enriched heavy product gas from countercurrent blowdown compartments 814 and 815 at the successively decreasing working pressures of those compartments, and finally from exhaust compartment 816 which is at the lower pressure of the cycle. Similarly to compressor 801, exhauster 803 may be provided as a multistage or split stream machine, with stages in series or in parallel to accept each flow at the appropriate intermediate pressure descending to the lower pressure.

In the example embodiment of FIG. 18, the lower pressure is ambient pressure, so exhaust compartment 816 exhaust directly to heavy product delivery conduit 804. Exhauster 803 thus provides pressure letdown with energy recovery to assist motor 805 from the countercurrent blowdown compartments 814 and 815. For simplicity, exhauster 803 may be replaced by throttling orifices as countercurrent blowdown pressure letdown means from compartments 814 and 815.

Figure 19:
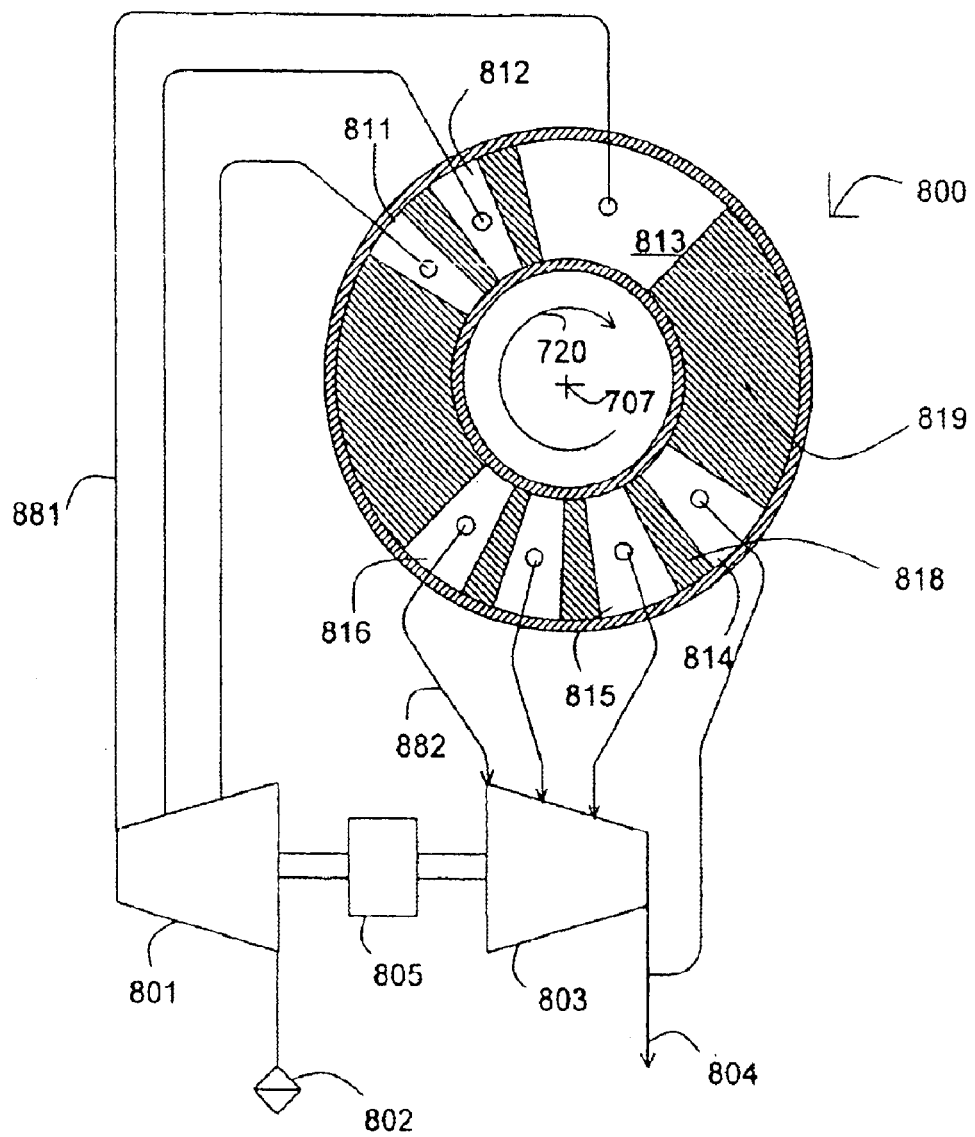
FIG. 19 shows a transverse section of the module of FIG. 15.

In some preferred embodiments, the lower pressure of the PSA cycle is subatmospheric. Exhauster 803 is then provided as a vacuum pump, as shown in FIG. 19. Again, the vacuum pump may be multistage or split stream, with separate stages in series or in parallel, to accept countercurrent blowdown streams exiting their compartments at working pressures greater than the lower pressure which is the deepest vacuum pressure. In FIG. 19, the early countercurrent blowdown stream from compartment 814 is released at ambient pressure directly to heavy product delivery conduit 804. If for simplicity a single stage vacuum pump were used, the countercurrent blowdown stream from compartment 815 would be throttled down to the lower pressure over an orifice to join the stream from compartment 816 at the inlet of the vacuum pump.

Figure 20:
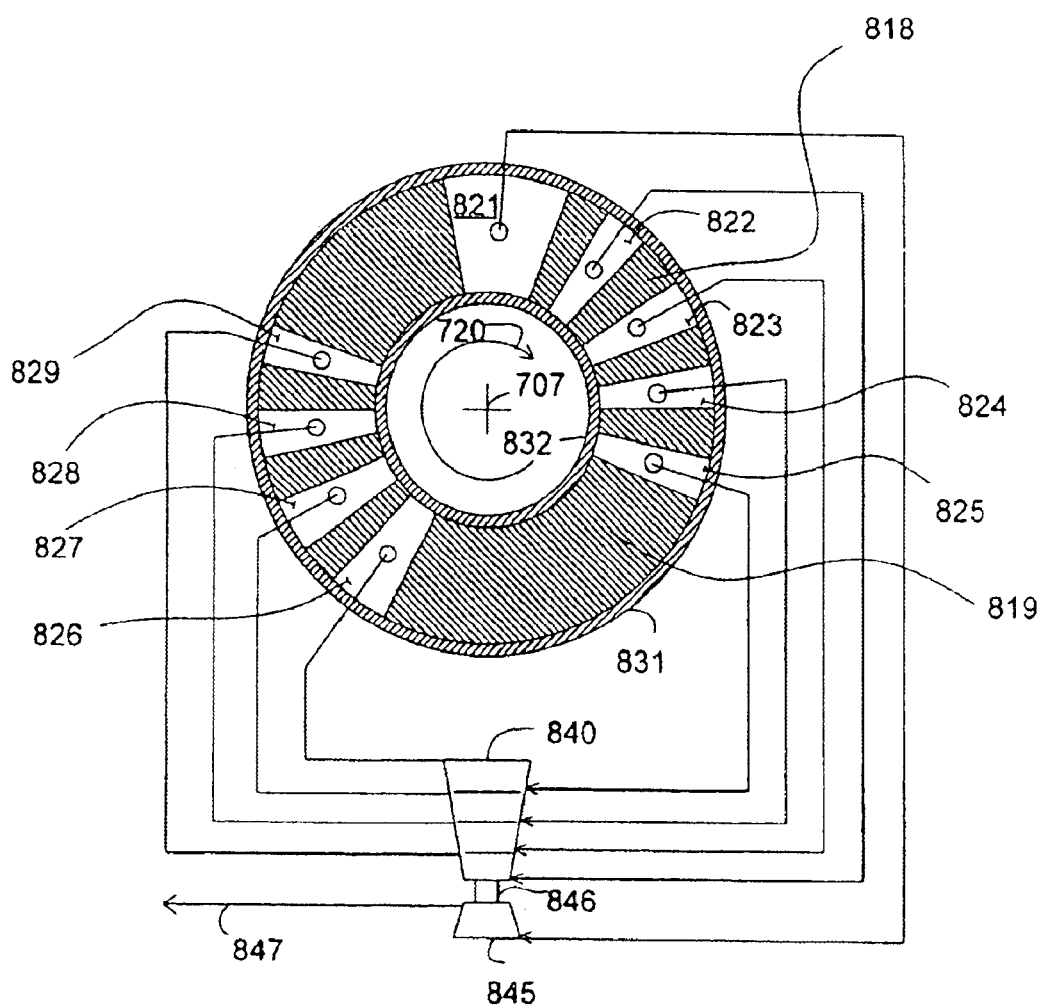
FIG. 20 shows a transverse section of the module of FIG. 15.
Figure 21:
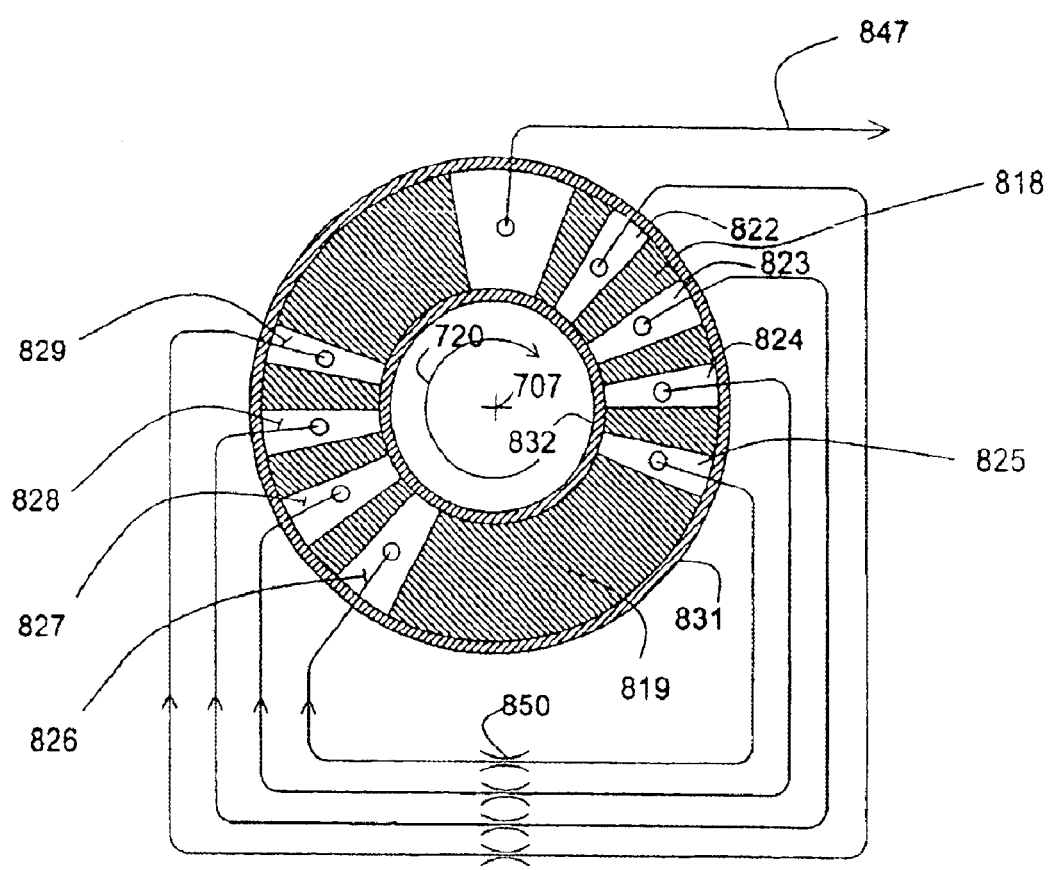
FIG. 21 shows a transverse section of the module of FIG. 15.

FIGS. 20 and 21 shows the second stator valve face, at section 716–717 of FIG. 15. Open ports of the valve face are second valve function ports communicating directly to a light product delivery compartment 821; a number of light reflux exit compartments 822, 823, 824 and 825; and the same number of light reflux return compartments 826, 827, 828 and 829 within the second stator. The second valve function ports are in the annular ring defined by circumferential seals 831 and 832. Each pair of light reflux exit and return compartments provides a stage of light reflux pressure letdown, respectively for the PSA process functions of supply to backfill, full or partial pressure equalization, and concurrent blowdown to purge.

Illustrating the option of light reflux pressure letdown with energy recovery, a split stream light reflux expander 840 is shown in FIGS. 15 and 20 to provide pressure let-down of four light reflux stages with energy recovery. The light reflux expander provides pressure let-down for each of four light reflux stages, respectively between light reflux exit and return compartments 822 and 829, 823 and 828, 824 and 827, and 825 and 826 as illustrated. The light reflux expander 840 may power a light product booster compressor 845 by drive shaft 846, which delivers the oxygen enriched light product to oxygen delivery conduit 847 and compressed to a delivery pressure above the higher pressure of the PSA cycle. Illustrating the option of light reflux pressure letdown with energy recovery, a split stream light reflux expander 840 is provided to provide pressure let-down of four light reflux stages with energy recovery. The light reflux expander serves as pressure let-down means for each of four light reflux stages, respectively between light reflux exit and return compartments 822 and 829, 823 and 828, 824 and 827, and 825 and 826 as illustrated.

Light reflux expander 840 is coupled to a light product pressure booster compressor 845 by drive shaft 846. Compressor 845 receives the light product from conduit 725, and delivers light product (compressed to a delivery pressure above the higher pressure of the PSA cycle) to delivery conduit 250. Since the light reflux and light product are both enriched oxygen streams of approximately the same purity, expander 840 and light product compressor 845 may be hermetically enclosed in a single housing which may conveniently be integrated with the second stator as shown in FIG. 15. This configuration of a "turbocompressor" oxygen booster without a separate drive motor is advantageous, as a useful pressure boost of the product oxygen can be achieved without an external motor and corresponding shaft seals, and can also be very compact when designed to operate at very high shaft speeds.

FIG. 21 shows the simpler alternative of using a throttle orifice 850 as the pressure letdown means for each of the light reflux stages.

Turning back to FIG. 15, compressed feed air is supplied to compartment 813 as indicated by arrow 825, while nitrogen enriched heavy product is exhausted from compartment 817 as indicated by arrow 826. The rotor is supported by bearing 860 with shaft seal 861 on rotor drive shaft 862 in the first stator 708, which is integrally assembled with the first and second valve stators. The absorber rotor is driven by motor 863 as rotor drive means.

As leakage across outer circumferential seal 831 on the second valve face 711 may compromise enriched oxygen purity, and more importantly may allow ingress of atmospheric humidity into the second ends of the adsorbers which could deactivate the nitrogen-selective adsorbent, a buffer seal 870 is provided to provide more positive sealing of a buffer chamber 871 between seals 831 and 871. A desiccant 873 (e.g. alumina, silica gel, sodium hydroxide, potassium hydroxide, magnesium perchlorate, barium oxide, phosphorous pentoxide, calcium chloride, calcium sulfate, calcium oxide, or magnesium oxide) may be included in buffer chamber 871 to provide more moisture protection. Even though the working pressure in some zones of the second valve face may be subatmospheric (in the case that a vacuum pump is used as exhauster 803), buffer chamber is filled with dry enriched oxygen product at a buffer pressure positively above ambient pressure. Hence, minor leakage of dry oxygen outward may take place, but humid air may not leak into the buffer chamber. In order to further minimize leakage and to reduce seal frictional torque, buffer seal 871 seals on a sealing face 872 at a much smaller diameter than the diameter of circumferential seal 831. Buffer seal 870 seals between a rotor extension 875 of absorber rotor 704 and the sealing face 872 on the second valve stator 709, with rotor extension 875 enveloping the rear portion of second valve stator 709 to form buffer chamber 871. A stator housing member 880 is provided as structural connection between first valve stator 8 and second valve stator 709.

FIG. 22

Figure 22:
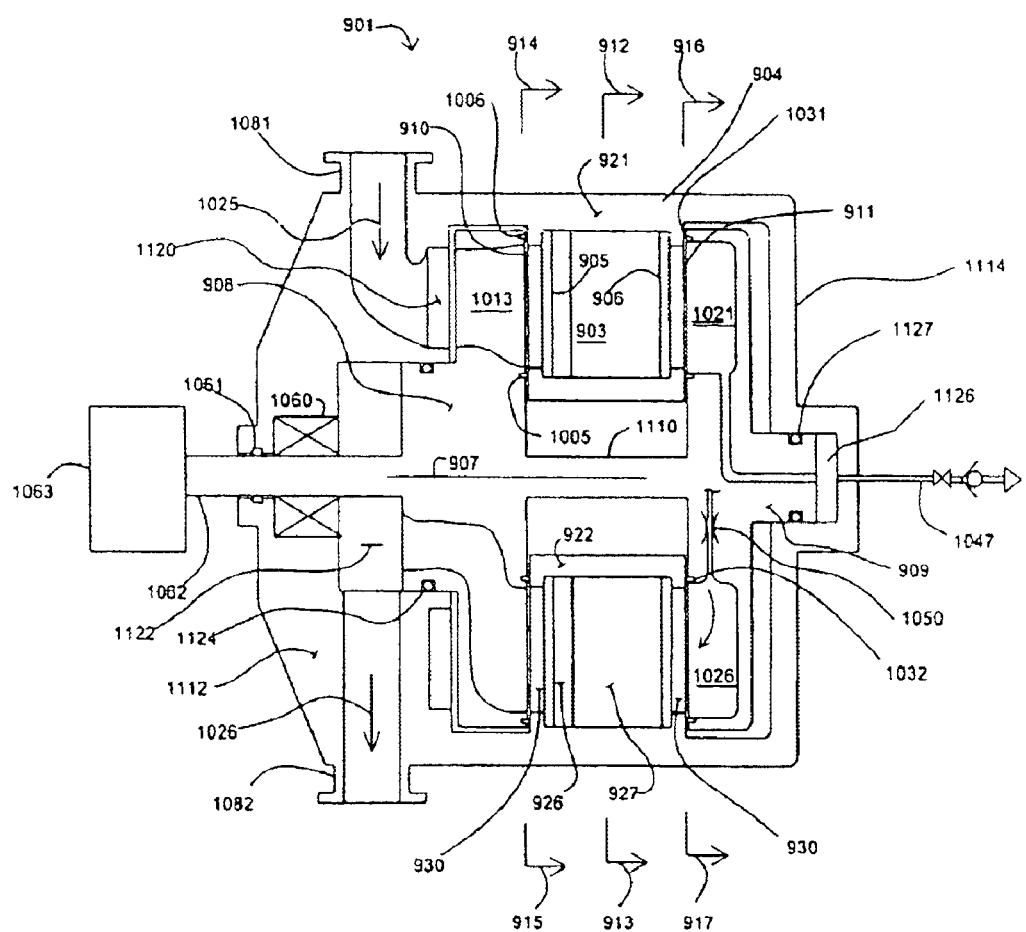
FIG. 22 shows an axial section of a rotary PSA module with stationary adsorbers and rotating distributor valves.

FIG. 22 shows an axial section of a rotary PSA embodiment, in which the adsorbers and absorber body housing 904 are stationary, while the first and second distributor valve bodies are first valve rotor 908 and second valve rotor 909 respectively engaged with first valve face 910 and second valve face 911. The first valve rotor 908 is driven by motor 1063 through shaft 1062, while the second valve rotor 9 is driven by connecting shaft 1110. As the arrows 720 in FIGS. 16–21 indicate the direction of relative motion of the absorber housing 904 relative to the distributor valve bodies, the rotation of valve rotors 908 and 909 for the stationary absorber embodiment of FIG. 22 may be in the opposite direction to arrows 720 when referred to the stationary housing 904. The first valve rotor 908 is installed within first valve housing 1112, and second valve rotor 909 is installed within second valve housing 214. Housings 1112 and 1114 are assembled with absorber housing 904 to form a complete pressure containment enclosure for the PSA module 901.

Alternative valve configurations and pressure balancing devices for the first and second rotating distributor valves for embodiments with stationary adsorbers are disclosed by Keefer et al in U.S. Pat. No. 6,063,161, the disclosure of which is incorporated herein.

For all externally connected flow functions where feed is provided to the first valve body, exhaust is withdrawn from the first valve body, or gas is withdrawn from or returned to the second valve body, fluid transfer chambers are provided for each such flow function, in order to establish fluid communication from the housing to the rotor for that function. Each fluid transfer chamber is an annular cavity in the valve rotor or its housing, providing fluid communication at all angular positions of the rotor between a functional compartment in the rotor and the corresponding external conduit connected to the housing. Rotary seals must be provided for each such fluid transfer chamber to prevent leakage. A particular advantage of rotary absorber embodiments is the elimination of such fluid transfer chambers and associated seals, since in those embodiments the first and second valve bodies are stationary and may be connected directly to external flow functions.

A feed transfer chamber 1120 communicates between feed conduit 1081 and functional compartment 1013 in the first valve rotor 908, and an exhaust transfer chamber 1122 communicates to exhaust conduit 1082 and functional compartment 1016 in the first valve rotor 908. Transfer chambers 1120 and 1122 are separated by rotary seal 1124. This configuration is suitable for a single stage feed compressor 1001 and a single stage exhauster 1003. Narrow clearance gaps in first valve face 910 may extend from compartment 1013 over the annular sectors corresponding to compartments 812 and 811 in FIGS. 18 and 19, and from compartment 1016 over the annular sectors corresponding to compartments 815 and 814 in FIGS. 18 and 19, so as to provide throttling for gentle pressurization and depressurization of each absorber being opened to compartments 1013 or 1016. While additional transfer chambers could be provided for additional compression or exhaust stages, it will be appreciated that this complication could be avoided with rotary absorber embodiments.

A product transfer chamber 1126 communicates between product delivery conduit 1047 and functional compartment 1021 in the second valve rotor 909. Rotary seal 1127 is provided for transfer chamber 1126. Additional transfer chambers could be provided in pairs for exit and return of each light reflux stage. This may be necessary if a light reflux expander 840 is provided as shown in FIG. 20. However, it will be much simpler in the stationary absorber embodiments to avoid fluid transfer between the second valve rotor 909 and its housing 1114 for light reflux stages. For stationary absorber embodiments, it will thus be preferred to use throttle orifices 850 for pressure let-down of each light reflux stage as shown in FIG. 21, with these orifices 850 installed within rotor 909 so that no fluid transfer between rotor 909 and housing 1114 is required for light reflux. One such orifice 1050 is shown in FIG. 22, with the connection to light reflux exit compartment 1025 being out of the sectional plane and accordingly not shown in the view of FIG. 22.

Axial Flow Oxygen Enrichment PSA Unit

The specific productivity and the yield of an axial flow rotary oxygen enrichment PSA module similar to module 701 of FIG. 15 was measured with air feed at 30° C. The module had a total volume of 18 L (not including the compressor, the vacuum pump, and the rotor drive motor), and a contained absorber volume of 8.2 L. Specific productivity is defined as normal liters of contained product oxygen delivered per hour per liter of absorber volume, and yield is defined as fractional recovery of oxygen contained in the product from oxygen contained in the feed air.

Operating in a vacuum-PSA mode at a cycle frequency of 100 cycles/minute with feed air compressed to 1.5 bars absolute and vacuum exhaust at 0.5 bars absolute, oxygen product at 70% purity was obtained with specific productivity of 1500 NL/L-hour, at a yield of 47%.

Operating in a vacuum-PSA mode at a cycle frequency of 100 cycles/minute with feed air compressed to 1.5 bars absolute and vacuum exhaust at 0.5 bars absolute, oxygen product at 70% was obtained with specific productivity improved to 1650 NL/L-hour and yield improved to 50.5%.

Operating in a vacuum-PSA mode at a cycle frequency of 100 cycles/minute with feed air compressed to 1.7 bars absolute and vacuum exhaust at 0.32 bars absolute, oxygen product at 80% purity was obtained with a specific productivity of 2500 NL/L-hour, at a yield of 56%.

Operating in a positive pressure PSA mode at a cycle frequency of 100 cycles/minute with feed air compressed to 3 bars absolute and exhaust at atmospheric pressure, oxygen product at 80% purity was obtained with a specific productivity of 1320 NL/L-hour, at a yield of 25.5%.

Operating in a positive pressure PSA mode at a cycle frequency of 100 cycles/minute with feed air compressed to 3 bars absolute and exhaust at atmospheric pressure, oxygen product at 70% purity was obtained with a specific productivity of 1750 NL/L-hour, at a yield of 33%.

For comparison, conventional oxygen industrial vacuum-PSA and PSA systems using granular adsorbent operate at cycle frequencies of only about 1 cycle/minute, achieving specific productivities of about 30 NL/L-hour. Specific productivities in the range of 130 to 170 NL/L-hour have been reported for a prior art rotary PSA device (See Vigor et al., U.S. Pat. No. 5,658,370). Keller et al. (U.S. Pat. No. 4,354,859) achieved specific productivities for oxygen in the range of 210 to 270 NL/L-hour by operating at cycle frequencies of 45 to 50 cycles/minute with a granular absorber of 40 to 80 mesh zeolite.

The high specific productivities realized with the axial flow rotary PSA system of the disclosure are thus substantially better than prior art systems, by one to two full orders of magnitude. High productivities from the disclosed compact PSA units are decisively important for automobile fuel cell applications, as prior art devices are far too bulky and heavy to be considered for such applications.

It is to be noted that the extreme compactness of the PSA devices provided for fuel cell systems by the present invention is enabled by operating at high cycle frequency (greater than 50 cycles per minute, and more preferably greater than 100 cycles per minute) with the dual enabling aspects of the rotary PSA mechanism and the adsorbent modules formed of thin adsorbent sheets with narrow channels spaced therebetween. At a specific productivity of 1500 NL/L-hour, the above mentioned PSA unit delivered about 200 NL/min of contained oxygen from a module volume of only 16 L. This oxygen flow rate would suffice for a 40 kW fuel cell, or for an even larger fuel cell if additional oxygen is provided by blending bypass air with the PSA product oxygen.

Hydrogen Purification PSA

Hydrogen purification PSA is particularly advantageous because it successfully removes impurities to a level that are not incompatible with PEM fuel cells. Such impurities include many compounds that are inherent to fossil fuel reforming or hydrogen recovery from chemical plant off-gases. For example, several particularly problematic compounds, such as ammonia, carbon monoxide, hydrogen sulfide, methanol vapor, and chlorine are removed effectively by PSA.

Methanol is a preferred feedstock for PEM fuel cells in stationary and automotive applications. Steam reforming of methanol generates raw hydrogen or syngas containing hydrogen, carbon dioxide and significant levels of carbon monoxide and unreacted methanol. The hydrogen PSA of the present disclosure has been tested on synthetic methanol syngas containing approximately 1% carbon monoxide, methanol vapor, and water vapor along with carbon dioxide as the bulk impurity. Each of the impurities was reduced below a concentration of 50 ppm.

Autothermal reforming, steam reforming or partial oxidation of other hydrocarbons (e.g. natural gas, gasoline, or diesel fuel) invariably produces raw hydrogen or syngas containing carbon dioxide and frequently nitrogen as bulk impurities, with carbon monoxide and frequently hydrogen sulfide as potentially harmful contaminants. All of these impurities can be adequately removed by the hydrogen PSA unit of the present disclosure.

The ability of the hydrogen PSA unit to remove severely harmful components such as carbon monoxide, methanol vapor and hydrogen sulfide is most important for PEM fuel cells, to extend their operating life, improve their reliability, and potentially also reduce their cost by enabling lower noble metal catalyst loadings on the fuel cell electrodes.

The ability of the hydrogen PSA unit to remove bulk impurities such as carbon dioxide and nitrogen allows the fuel cell to operate with a high partial pressure of hydrogen and with a much smaller cathode purge flow, thus improving electrochemical energy conversion efficiency while also improving hydrogen utilization within the fuel cell anode channel.

The foregoing description is intended to be illustrative of the preferred embodiments of the present invention. Those of ordinary skill may envisage certain additions, deletions and/or modifications to the described embodiments which, although not specifically described or referred to herein, do not depart from the spirit or scope of the present invention as defined by the appended claims.

We claim:

1. An electrical current generating system, comprising:
   at least one fuel cell; and
   a hydrogen gas delivery system coupled to the fuel cell for delivering hydrogen to the fuel cell, the hydrogen gas delivery system comprising a rotary pressure swing adsorption module, wherein the rotary pressure swing adsorption module includes an adsorbent that preferentially adsorbs at least one carbon oxide.

2. The system according to claim 1, wherein the carbon oxide is carbon monoxide or carbon dioxide.

3. An electrical current generating system comprising:
   a fuel cell including an anode channel including an anode gas inlet and an anode gas outlet, a cathode channel including a cathode gas inlet and a cathode gas outlet, and an electrolyte in communication with the anode and cathode channel for facilitating exchange between the anode and cathode channel;
   an oxygen gas delivery system coupled to the cathode gas inlet for delivering oxygen gas to the cathode channel; and
   a hydrogen gas delivery system coupled to the anode gas inlet for delivering a gaseous stream enriched in hydrogen gas to the anode channel, including a first rotary pressure swing adsorption system for enriching hydrogen in a gaseous feed, where the first rotary pressure swing adsorption system includes a first gas feed gas inlet for receiving a first gas feed comprising hydrogen gas and a gas outlet coupled to the anode gas inlet.

4. The system according to claim 3, wherein the first rotary pressure swing adsorption system includes an adsorbent that preferentially adsorbs at least one carbon oxide.

5. The system according to claim 4, wherein the carbon oxide is carbon monoxide or carbon dioxide.

6. The electrical current generation system according to claim 3 where the hydrogen gas delivery system includes a gas inlet for receiving a second gas feed from the anode gas outlet and a gas outlet for delivering the gaseous stream enriched in hydrogen gas to the anode channel.

7. The electrical current generation system according to claim 6 where the second gas feed is passed through the first rotary pressure swing adsorption system.

8. The electrical current generation system according to claim 7 where the first rotary pressure swing adsorption system includes a second feed gas inlet for receiving the second gas feed.

9. The electrical current generating system according to claim 8 where the hydrogen gas delivery system comprises a reactor for producing the first gas feed from hydrocarbon fuel, and wherein the first rotary pressure swing adsorption system is coupled to the reactor for receiving the first and second gas feeds.

10. The electrical current generating system according to claim 3 wherein the hydrogen gas delivery system comprises a reactor for producing the first hydrogen gas feed from hydrocarbon fuel.

11. The electrical current generating system according to claim 9 where the first rotary pressure swing adsorption system hydrogen includes a first feed gas inlet for receiving the first gas feed, and a second feed gas inlet for receiving the second gas feed.

12. The electrical current generating system according to claim 11 where the first gas feed is provided at a pressure level different from a pressure level of the second gas feed.

13. The electrical current generating system according to claim 9 where the reactor comprises a steam reformer, and a water gas shift reactor coupled to the steam reformer for producing the first gas feed.

14. The electrical current generating system according to claim 9 wherein the reactor comprises an autothermal reformer, and a water gas shift reactor coupled to the steam reformer for producing the first gas feed.

15. The electrical generating system according to claim 3 further comprising a gas recirculation means coupled to the cathode gas outlet for recirculating a portion of cathode exhaust gas exhausted from the cathode channel to the cathode gas inlet.

16. The electrical generating system according to claim 9 further comprising a gas recirculation means coupled to the cathode gas outlet for recirculating a portion of cathode exhaust gas exhausted from the cathode channel to the reactor for producing hydrogen from hydrocarbon fuel.

* * * * *